US008392299B2

(12) United States Patent
Sorbe et al.

(10) Patent No.: US 8,392,299 B2
(45) Date of Patent: *Mar. 5, 2013

(54) TRANSFER ACCOUNT SYSTEMS, COMPUTER PROGRAM PRODUCTS, AND ASSOCIATED COMPUTER-IMPLEMENTED METHODS

(75) Inventors: Trent Sorbe, Brookings, SD (US); Troy Larson, Brandon, SD (US)

(73) Assignee: Metabank, Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,186

(22) Filed: Oct. 26, 2011

(65) Prior Publication Data

US 2012/0041875 A1 Feb. 16, 2012

Related U.S. Application Data

(63) Continuation of application No. 12/338,365, filed on Dec. 18, 2008, now Pat. No. 8,055,557, which is a continuation of application No. 12/338,584, filed on Dec. 18, 2008.

(60) Provisional application No. 61/016,213, filed on Dec. 21, 2007, provisional application No. 61/052,454, filed on May 12, 2008.

(51) Int. Cl.
*G06Q 40/02* (2012.01)

(52) U.S. Cl. ................ 705/30; 705/44; 705/40; 705/38; 705/500; 700/1; 235/388

(58) Field of Classification Search .................... 705/30, 705/44, 40, 39, 500; 700/1; 235/388
See application file for complete search history.

(56) References Cited

U.S. PATENT DOCUMENTS 3,752,904 A 8/1973 Waterbury
4,247,759 A 1/1981 Yuris et al.
4,334,307 A 6/1982 Bourgeois et al.
4,439,636 A 3/1984 Newkirk et al.
4,449,040 A 5/1984 Matsuoka et al.
4,528,643 A 7/1985 Freeny, Jr.
4,532,416 A 7/1985 Berstein
4,577,061 A 3/1986 Katzaff et al.
4,625,276 A 11/1986 Benton et al.
4,677,565 A 6/1987 Ogaki et al.
4,678,895 A 7/1987 Tateisi et al.
4,706,275 A 11/1987 Kamal (Continued)

FOREIGN PATENT DOCUMENTS

EP 0397512 11/1990
EP 0619565 10/1994

(Continued)

OTHER PUBLICATIONS

Downes, How to avoid exchange charges Wasting Money A foreign currency bank account could be the answer, The Daily Telegraph, London (UK), Mar. 10, 2007.

(Continued)

*Primary Examiner* — Vanel Frenel
(74) *Attorney, Agent, or Firm* — Bracewell & Giuliani LLP

(57) ABSTRACT

Embodiments of the present invention include transfer account systems, computer program products, and associated computer-implemented methods of providing prioritized payments from the proceeds of automatic or direct deposits. Embodiments of the present invention include routing automatic deposit information to a financial institution computer managing a prioritized payment program and formulating an outgoing ACH file with both an entry for an automatic deposit destined for a customer account and an entry for a pre-authorized prioritized payment to a select creditor, so that the automatic deposit is credited to the customer account and relatively instantaneously any prioritized payment is debited from the customer account. According to embodiments of the present invention, the customer account can be a prepaid card account so that a customer has effective access on the prepaid card only to a net value of funds.

20 Claims, 12 Drawing Sheets

U.S. PATENT DOCUMENTS

| | | | |
|---|---|---|---|
| 4,722,054 | A | 1/1988 | Yorozu et al. |
| 4,727,243 | A | 2/1988 | Saver |
| 4,750,201 | A | 6/1988 | Hodgson et al. |
| 4,797,540 | A | 1/1989 | Kimizu |
| 4,827,113 | A | 5/1989 | Rikuna |
| 4,868,900 | A | 9/1989 | McGuire |
| 4,877,947 | A | 10/1989 | Mori |
| 4,879,744 | A | 11/1989 | Tasaki et al. |
| 4,884,212 | A | 11/1989 | Stutsman |
| 4,951,308 | A | 8/1990 | Bishop et al. |
| 4,968,873 | A | 11/1990 | Dethloff et al. |
| 5,012,077 | A | 4/1991 | Takano |
| 5,048,085 | A | 9/1991 | Abraham et al. |
| 5,050,207 | A | 9/1991 | Hitchcock |
| 5,068,891 | A | 11/1991 | Marshall |
| 5,101,098 | A | 3/1992 | Naito |
| 5,138,650 | A | 8/1992 | Stahl et al. |
| 5,146,067 | A | 9/1992 | Sloan et al. |
| 5,148,481 | A | 9/1992 | Abraham et al. |
| 5,155,342 | A | 10/1992 | Urano |
| 5,163,086 | A | 11/1992 | Ahearn et al. |
| 5,192,947 | A | 3/1993 | Neustein |
| 5,220,593 | A | 6/1993 | Zicker et al. |
| 5,221,838 | A | 6/1993 | Gutman et al. |
| 5,225,666 | A | 7/1993 | Amarena et al. |
| 5,264,689 | A | 11/1993 | Maes et al. |
| 5,265,155 | A | 11/1993 | Castro |
| 5,266,782 | A | 11/1993 | Alanara et al. |
| 5,272,320 | A | 12/1993 | Hakamada |
| 5,278,752 | A | 1/1994 | Narita et al. |
| 5,285,382 | A | 2/1994 | Muehlberger et al. |
| 5,327,482 | A | 7/1994 | Yamamoto |
| 5,334,821 | A | 8/1994 | Campo et al. |
| 5,340,969 | A | 8/1994 | Cox |
| 5,352,876 | A | 10/1994 | Wanatabe et al. |
| 5,359,182 | A | 10/1994 | Schiling |
| 5,409,092 | A | 4/1995 | Itako et al. |
| 5,416,306 | A | 5/1995 | Imahata |
| 5,438,186 | A | 8/1995 | Nair et al. |
| 5,442,567 | A | 8/1995 | Small |
| 5,448,044 | A | 9/1995 | Price et al. |
| 5,465,206 | A | 11/1995 | Hilt et al. |
| 5,477,038 | A | 12/1995 | Levine et al. |
| 5,504,808 | A | 4/1996 | Hamrick, Jr. |
| 5,511,114 | A | 4/1996 | Stimson et al. |
| 5,513,117 | A | 4/1996 | Small |
| 5,550,358 | A | 8/1996 | Tait et al. |
| 5,577,109 | A | 11/1996 | Stimson et al. |
| 5,577,121 | A | 11/1996 | Davis et al. |
| 5,661,254 | A | 8/1997 | Steuer et al. |
| 5,696,908 | A | 12/1997 | Muehlberger et al. |
| 5,699,528 | A | 12/1997 | Hogan |
| 5,732,136 | A | 3/1998 | Murphree et al. |
| 5,814,798 | A | 9/1998 | Zancho |
| 5,841,365 | A | 11/1998 | Rimkus |
| 5,859,419 | A | 1/1999 | Wynn |
| 5,870,721 | A | 2/1999 | Norris |
| 5,875,437 | A | 2/1999 | Atkins |
| 5,878,141 | A | 3/1999 | Daly et al. |
| 5,893,907 | A | 4/1999 | Ukuda |
| 5,897,620 | A | 4/1999 | Walker et al. |
| 5,920,848 | A | 7/1999 | Schutzer et al. |
| 5,923,016 | A | 7/1999 | Fredregill et al. |
| 5,933,812 | A | 8/1999 | Meyer et al. |
| 5,963,921 | A | 10/1999 | Longfield |
| 6,000,608 | A | 12/1999 | Dorf |
| 6,012,635 | A | 1/2000 | Shimada et al. |
| 6,021,397 | A | 2/2000 | Jones et al. |
| 6,032,859 | A | 3/2000 | Muehlberger et al. |
| 6,041,308 | A | 3/2000 | Walker et al. |
| 6,065,679 | A | 5/2000 | Levie et al. |
| 6,112,191 | A | 8/2000 | Burke |
| 6,144,948 | A | 11/2000 | Walker et al. |
| 6,154,738 | A | 11/2000 | Call |
| 6,189,787 | B1 | 2/2001 | Dorf |
| 6,208,978 | B1 | 3/2001 | Walker et al. |
| 6,249,773 | B1 | 6/2001 | Allard et al. |
| 6,253,998 | B1 | 7/2001 | Ziamo |
| 6,304,860 | B1 | 10/2001 | Martin et al. |
| 6,315,193 | B1 | 11/2001 | Hogan |
| 6,467,684 | B2 | 10/2002 | Fite et al. |
| 6,704,714 | B1 | 3/2004 | O'Leary et al. |
| 6,739,506 | B1 | 5/2004 | Constantine |
| 6,865,544 | B1 | 3/2005 | Austin |
| 6,920,434 | B1 | 7/2005 | Cossette |
| 6,999,943 | B1 | 2/2006 | Johnson et al. |
| 7,031,939 | B1 | 4/2006 | Gallagher et al. |
| 7,072,862 | B1 | 7/2006 | Wilson |
| 7,127,452 | B1 | 10/2006 | Yashiro |
| 7,177,829 | B1 | 2/2007 | Wilson et al. |
| 7,206,761 | B2 | 4/2007 | Colvin |
| 7,252,223 | B2 | 8/2007 | Schofield |
| 7,258,273 | B2 | 8/2007 | Griffin |
| 7,370,076 | B2 | 5/2008 | Friedman et al. |
| 7,398,919 | B2 | 7/2008 | Cooper |
| 7,426,492 | B1 | 9/2008 | Bishop et al. |
| 7,451,920 | B1 | 11/2008 | Rose |
| 7,472,089 | B2 | 12/2008 | Hu et al. |
| 7,493,279 | B1 | 2/2009 | Kwan |
| 7,509,286 | B1 | 3/2009 | Bent et al. |
| 7,546,945 | B1 | 6/2009 | Bucci et al. |
| 7,567,936 | B1 | 7/2009 | Peckover et al. |
| 7,599,879 | B2 | 10/2009 | Louie et al. |
| 7,606,918 | B2 | 10/2009 | Holzman et al. |
| 7,607,570 | B1 | 10/2009 | Constantine |
| 7,628,319 | B2 | 12/2009 | Brown et al. |
| 7,653,591 | B1 | 1/2010 | Dabney |
| 7,702,583 | B1 | 4/2010 | Hamilton et al. |
| 7,702,587 | B2 | 4/2010 | Nguyen et al. |
| 7,757,944 | B2 | 7/2010 | Cline et al. |
| 7,783,571 | B2 | 8/2010 | Fish et al. |
| 7,792,717 | B1 | 9/2010 | Hankins et al. |
| 7,810,735 | B2 | 10/2010 | Madani |
| 7,813,955 | B2 | 10/2010 | Ariff et al. |
| 7,814,012 | B2 | 10/2010 | Johnson |
| 7,865,434 | B2 | 1/2011 | Sheets |
| 7,873,569 | B1 | 1/2011 | Cahn |
| 7,899,750 | B1 | 3/2011 | Klieman et al. |
| 7,904,333 | B1 | 3/2011 | Perkowski |
| 7,933,833 | B2 | 4/2011 | Hotz et al. |
| 7,954,704 | B1 | 6/2011 | Gephart et al. |
| 8,024,242 | B2 | 9/2011 | Galit |
| 8,046,256 | B2 | 10/2011 | Chien et al. |
| 8,051,006 | B1 | 11/2011 | Rourk |
| 8,055,557 | B2 | 11/2011 | Sorbe et al. |
| 8,065,187 | B2 | 11/2011 | Ahlers et al. |
| 8,069,085 | B2 | 11/2011 | Ahlers et al. |
| 8,086,494 | B2 | 12/2011 | Dooley et al. |
| 8,090,649 | B2 | 1/2012 | Galit et al. |
| 8,103,549 | B1 | 1/2012 | Ahlers et al. |
| 8,108,272 | B2 | 1/2012 | Sorbe et al. |
| 8,108,279 | B2 | 1/2012 | Galit et al. |
| 8,108,977 | B1 | 2/2012 | Miller |
| 8,150,764 | B2 | 4/2012 | Crowe et al. |
| 8,214,286 | B1 | 7/2012 | Galit et al. |
| 8,244,611 | B2 | 8/2012 | Galit |
| 8,244,637 | B2 | 8/2012 | Galit et al. |
| 2001/0021925 | A1 | 9/2001 | Ukigawa et al. |
| 2001/0034663 | A1 | 10/2001 | Teveler et al. |
| 2001/0034676 | A1 | 10/2001 | Vasic |
| 2001/0042785 | A1 | 11/2001 | Walker et al. |
| 2002/0002075 | A1 | 1/2002 | Rowe |
| 2002/0032612 | A1 | 3/2002 | Williams et al. |
| 2002/0038285 | A1 | 3/2002 | Golden et al. |
| 2002/0042744 | A1 | 4/2002 | Kohl |
| 2002/0055904 | A1 | 5/2002 | Mon |
| 2002/0055909 | A1 | 5/2002 | Fung et al. |
| 2002/0077971 | A1 | 6/2002 | Allred |
| 2002/0107797 | A1 | 8/2002 | Combaluzier |
| 2002/0152161 | A1 | 10/2002 | Aoike |
| 2002/0194122 | A1 | 12/2002 | Knox et al. |
| 2002/0194124 | A1 | 12/2002 | Hobbs et al. |
| 2003/0004997 | A1 | 1/2003 | Parker et al. |
| 2003/0055782 | A1 | 3/2003 | Slater |
| 2003/0061170 | A1 | 3/2003 | Uzo |
| 2003/0074311 | A1 | 4/2003 | Saylors et al. |
| 2003/0097331 | A1 | 5/2003 | Cohen |

| | | | |
|---|---|---|---|
| 2003/0135459 | A1 | 7/2003 | Abelman et al. |
| 2003/0144935 | A1 | 7/2003 | Sobek |
| 2003/0158811 | A1 | 8/2003 | Sanders et al. |
| 2003/0167225 | A1 | 9/2003 | Adams |
| 2003/0191702 | A1 | 10/2003 | Hurley |
| 2003/0191714 | A1 | 10/2003 | Norris |
| 2003/0197059 | A1 | 10/2003 | Tidball et al. |
| 2003/0200118 | A1 | 10/2003 | Lee et al. |
| 2003/0208443 | A1 | 11/2003 | Mersky |
| 2003/0217003 | A1 | 11/2003 | Weinflash et al. |
| 2004/0036215 | A1 | 2/2004 | Butler |
| 2004/0047459 | A1 | 3/2004 | Diaz |
| 2004/0098351 | A1 | 5/2004 | Duke |
| 2004/0111370 | A1 | 6/2004 | Saylors et al. |
| 2004/0117250 | A1 | 6/2004 | Lubow et al. |
| 2004/0117302 | A1 | 6/2004 | Weichert et al. |
| 2004/0133515 | A1 | 7/2004 | McCoy et al. |
| 2004/0143527 | A1 | 7/2004 | Benkert et al. |
| 2004/0148252 | A1 | 7/2004 | Fleishman |
| 2004/0153407 | A1 | 8/2004 | Clubb et al. |
| 2004/0199463 | A1 | 10/2004 | Deggendorf |
| 2004/0210484 | A1 | 10/2004 | Lee |
| 2004/0211830 | A1 | 10/2004 | Algiene |
| 2004/0215554 | A1 | 10/2004 | Kemper et al. |
| 2004/0225545 | A1 | 11/2004 | Turner et al. |
| 2004/0230523 | A1 | 11/2004 | Johnson |
| 2004/0235542 | A1 | 11/2004 | Stronach et al. |
| 2004/0236646 | A1 | 11/2004 | Wu et al. |
| 2005/0004839 | A1 | 1/2005 | Bakker et al. |
| 2005/0015332 | A1 | 1/2005 | Chen |
| 2005/0021363 | A1 | 1/2005 | Stimson et al. |
| 2005/0075939 | A1 | 4/2005 | Bao et al. |
| 2005/0082364 | A1 | 4/2005 | Alvarez et al. |
| 2005/0108121 | A1 | 5/2005 | Gravett et al. |
| 2005/0167481 | A1 | 8/2005 | Hansen et al. |
| 2005/0167487 | A1 | 8/2005 | Conlon et al. |
| 2005/0173520 | A1 | 8/2005 | Jaros et al. |
| 2005/0177489 | A1 | 8/2005 | Neff et al. |
| 2005/0203837 | A1 | 9/2005 | Leigh et al. |
| 2005/0205663 | A1 | 9/2005 | Algiene |
| 2005/0228724 | A1 | 10/2005 | Frangiosa |
| 2005/0278188 | A1 | 12/2005 | Thomson et al. |
| 2005/0278347 | A1 | 12/2005 | Wolf et al. |
| 2005/0283436 | A1 | 12/2005 | Greer et al. |
| 2006/0059085 | A1 | 3/2006 | Tucker |
| 2006/0085269 | A1 | 4/2006 | Guilfoyle |
| 2006/0085334 | A1 | 4/2006 | Murphy |
| 2006/0149665 | A1 | 7/2006 | Weksler |
| 2006/0149670 | A1 | 7/2006 | Nguyen et al. |
| 2006/0161499 | A1 | 7/2006 | Rich et al. |
| 2006/0190322 | A1 | 8/2006 | Oehlerking et al. |
| 2006/0206402 | A1 | 9/2006 | Sullivan |
| 2006/0212392 | A1 | 9/2006 | Brown |
| 2006/0212393 | A1 | 9/2006 | Brown |
| 2006/0224502 | A1 | 10/2006 | McGowan |
| 2006/0249570 | A1 | 11/2006 | Seifert |
| 2006/0259957 | A1 | 11/2006 | Tam et al. |
| 2006/0282356 | A1 | 12/2006 | Andres et al. |
| 2006/0282374 | A1 | 12/2006 | Stone |
| 2006/0293966 | A1 | 12/2006 | Inouye |
| 2007/0000997 | A1 | 1/2007 | Lambert et al. |
| 2007/0011089 | A1 | 1/2007 | DeSchryver |
| 2007/0038515 | A1 | 2/2007 | Postrel |
| 2007/0038924 | A1 | 2/2007 | Beyer et al. |
| 2007/0045401 | A1 | 3/2007 | Sturm |
| 2007/0061206 | A1 | 3/2007 | LeFebvre |
| 2007/0083462 | A1 | 4/2007 | Cubillo et al. |
| 2007/0087819 | A1 | 4/2007 | VanLuchene et al. |
| 2007/0090183 | A1 | 4/2007 | Hursta et al. |
| 2007/0100745 | A1 | 5/2007 | Keiser et al. |
| 2007/0100746 | A1 | 5/2007 | Blair et al. |
| 2007/0106603 | A1 | 5/2007 | Whyte et al. |
| 2007/0136194 | A1 | 6/2007 | Sloan |
| 2007/0152038 | A1 | 7/2007 | Ciancio et al. |
| 2007/0168265 | A1 | 7/2007 | Rosenberger |
| 2007/0174189 | A1 | 7/2007 | Bishop et al. |
| 2007/0175982 | A1 | 8/2007 | Bonalle et al. |
| 2007/0175984 | A1 | 8/2007 | Khandaker et al. |
| 2007/0198352 | A1 | 8/2007 | Kannegiesser |
| 2007/0198354 | A1 | 8/2007 | Senghore et al. |
| 2007/0198403 | A1 | 8/2007 | Aloni et al. |
| 2007/0233596 | A1 | 10/2007 | Ambrose |
| 2007/0244778 | A1 | 10/2007 | Bailard |
| 2007/0250380 | A1 | 10/2007 | Mankoff |
| 2007/0260536 | A1 | 11/2007 | Stone |
| 2007/0262140 | A1 | 11/2007 | Long, Sr. |
| 2007/0265957 | A1 | 11/2007 | Advani et al. |
| 2007/0265960 | A1 | 11/2007 | Advani et al. |
| 2007/0267479 | A1 | 11/2007 | Nix et al. |
| 2007/0271178 | A1 | 11/2007 | Davis et al. |
| 2007/0276736 | A1 | 11/2007 | Guilfoyle |
| 2007/0282740 | A1 | 12/2007 | Wendt |
| 2008/0005001 | A1 | 1/2008 | Davis et al. |
| 2008/0021772 | A1 | 1/2008 | Aloni et al. |
| 2008/0040261 | A1 | 2/2008 | Nix et al. |
| 2008/0040265 | A1 | 2/2008 | Rackley et al. |
| 2008/0052189 | A1 | 2/2008 | Walker et al. |
| 2008/0059363 | A1 | 3/2008 | Holtz et al. |
| 2008/0065532 | A1 | 3/2008 | De la Motte |
| 2008/0091519 | A1 | 4/2008 | Foss |
| 2008/0103970 | A1 | 5/2008 | Books et al. |
| 2008/0120129 | A1 | 5/2008 | Seubert et al. |
| 2008/0140561 | A1 | 6/2008 | Neel |
| 2008/0140568 | A1 | 6/2008 | Henry |
| 2008/0162271 | A1 | 7/2008 | Benjamin |
| 2008/0210753 | A1 | 9/2008 | Plozay et al. |
| 2008/0228643 | A1 | 9/2008 | Hall |
| 2008/0235095 | A1 | 9/2008 | Oles et al. |
| 2008/0270298 | A1 | 10/2008 | McElroy et al. |
| 2008/0281734 | A1 | 11/2008 | Longe et al. |
| 2008/0294977 | A1 | 11/2008 | Friedman et al. |
| 2008/0301162 | A1 | 12/2008 | Wall et al. |
| 2009/0048963 | A1 | 2/2009 | Bishop et al. |
| 2009/0061929 | A1 | 3/2009 | Evans |
| 2009/0063297 | A1 | 3/2009 | Dooley et al. |
| 2009/0063342 | A1 | 3/2009 | Beckers |
| 2009/0063351 | A1 | 3/2009 | Schmeyer et al. |
| 2009/0157220 | A1 | 6/2009 | Walker et al. |
| 2009/0164351 | A1 | 6/2009 | Sorbe et al. |
| 2009/0164362 | A1 | 6/2009 | Moore |
| 2009/0164363 | A1 | 6/2009 | Ahlers |
| 2009/0171775 | A1 | 7/2009 | Cashion et al. |
| 2009/0192934 | A1 | 7/2009 | Chu et al. |
| 2009/0222367 | A1 | 9/2009 | Jenkins et al. |
| 2009/0228307 | A1 | 9/2009 | Sorbe |
| 2009/0254431 | A1 | 10/2009 | Crowe et al. |
| 2010/0030687 | A1 | 2/2010 | Panthaki et al. |
| 2010/0057554 | A1 | 3/2010 | Lanford |
| 2010/0057609 | A1 | 3/2010 | Sibson |
| 2010/0076875 | A1 | 3/2010 | Ernst et al. |
| 2010/0106555 | A1 | 4/2010 | Mneimneh et al. |
| 2010/0222132 | A1 | 9/2010 | Sanford et al. |
| 2010/0280949 | A1 | 11/2010 | VanRensburg |
| 2010/0306104 | A1 | 12/2010 | Johnson |
| 2010/0312684 | A1 | 12/2010 | Kemper et al. |
| 2011/0047039 | A1 | 2/2011 | Crames et al. |
| 2011/0106698 | A1 | 5/2011 | Isaacson et al. |
| 2011/0270664 | A1 | 11/2011 | Jones |

FOREIGN PATENT DOCUMENTS

| | | |
|---|---|---|
| EP | 0348932 | 5/1995 |
| JP | 2-238593 | 9/1990 |
| JP | 2-278495 | 11/1990 |
| JP | 3-100791 | 4/1991 |
| JP | 4-165588 | 6/1992 |
| KR | 2010010217 | 2/2010 |
| WO | 86/02757 | 5/1986 |
| WO | 86/07647 | 12/1986 |
| WO | 88/03297 | 5/1988 |
| WO | 89/08899 | 9/1989 |
| WO | 91/09370 | 6/1991 |
| WO | 93/09515 | 5/1993 |
| WO | 94/10649 | 5/1994 |
| WO | 94/28498 | 12/1994 |
| WO | 95/03570 | 2/1995 |
| WO | 97/46986 | 12/1997 |
| WO | 00/60487 | 10/2000 |

| | | | |
|---|---|---|---|
| WO | 2007/133315 | | 11/2007 |
| WO | 2008102329 | A2 | 8/2008 |
| ZA | 200709282 | | 10/2007 |

OTHER PUBLICATIONS

Office Action for co-pending U.S. Appl. No. 13/232,405 dated Feb. 2, 2012.
Office Action for co-pending U.S. Appl. No. 12/877,524 dated Feb. 14, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Final Office Action for co-pending U.S. Appl. No. 12/465,277, dated Feb. 28, 2012.
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
*Ex-parte Quayle* Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Final Office Action for co-pending U.S. Appl. No. 12/338,540 dated Mar. 15, 2012.
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Notice of Allowance for co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Office Action in co-pending U.S. Appl. No. 12/367,187 dated Jun. 27, 2011.
Office Action in co-pending U.S. Appl. No. 12/609,896 dated Apr. 5, 2011.
Office Action in co-pending U.S. Appl. No. 12/417,162 dated Apr. 13, 2011.
Office Action in co-pending U.S. Appl. No. 12/338,684 dated Mar. 4, 2011.
Office Action in co-pending U.S. Appl. No. 12/417,199 dated Mar. 17, 2011.
Office Action in co-pending U.S. Appl. No. 12/465,803 dated Mar. 17, 2011.
Office Action in co-pending U.S. Appl. No. 12/338,584 dated Mar. 22, 2011.
Office Action in co-pending U.S. Appl. No. 12/417,211 dated Mar. 29, 2011.
Office Action in co-pending U.S. Appl. No. 12/407,320 dated Mar. 29, 2011.
Office Action in co-pending U.S. Appl. No. 12/338,402 dated Feb. 18, 2011.
Office Action in co-pending U.S. Appl. No. 12/338,402 dated Sep. 28, 2010.
Office Action in co-pending U.S. Appl. No. 12/417,162 dated Sep. 3, 2010.
International Search Report for PCT/US09/56072 dated Oct. 20, 2009.
International Search Report for PCT/US09/39504 dated May 27, 2009.
International Search Report for PCT/US09/39512 dated Jun. 8, 2009.
International Search Report for PCT/US09/43978 dated Jun. 30, 2009.
International Search Report for PCT/US09/43988 dated Jul. 14, 2009.
International Search Report for PCT/US09/39492 dated May 14, 2009.
International Search Report for PCT/US09/39495 dated May 18, 2009.
International Search Report for PCT/US08/87689 dated Jun. 17, 2009.
Office Action in co-pending U.S. Appl. No. 12/338,645 dated Jul. 9, 2010.
Office Action in co-pending U.S. Appl. No. 12/338,365 dated Jul. 9, 2010.
Office Action in co-pending U.S. Appl. No. 12/338,365 dated Jan. 26, 2011.
Office Action in co-pending U.S. Appl. No. 12/417,162 dated Jan. 19, 2011.
Office Action in co-pending U.S. Appl. No. 12/389,749 dated Feb. 1, 2011.
Office Action in co-pending U.S. Appl. No. 12/338,540 dated Sep. 1, 2011.
International Search Report for PCT/US09/34692 dated Apr. 14, 2009.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Office Action in co-pending U.S. Appl. No. 12/397,113 dated Sep. 20, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Office Action in co-pending U.S. Appl. No. 12/626,349, dated Nov. 22, 2011.
Notice of Allowance for co-pending U.S. Appl. No. 12/338,365, dated Sep. 1, 2011.
Jane Boon Pearlstine, “Lenders, Borrowers Hook Up Over the Web: Prosper.com and Other Sites Provide Forum for Individual Bidders Willing to Offer Small Loans”, Wall Street Journal, May 20, 2006.
United Nations Conference on Trade and Development, “E-Finance and Small and Medium-Size Enterprises (SMEs) in Developing and Transition Economies”, UNCTAD Expert Meeting, Oct. 17, 2001.
Tim Jones, “Paradigms Lost”, RSA Journal, Oct. 2006,pp. 28-31.
Diego Rumiany, “Internet Bidding for Microcredit: Making it Work in the Developed World, Conceiving it for the Developing World”, Mar. 2007.
Stefan Heng, Thomas Meyer,and Antje Stobbe, “Implications of Web 2.0 for Financial Institutions: Be a Driver, Not a Passenger”, Munich Personal RePEc Archive, Jul. 31, 2007.
Matt Flannery, “Kiva and the Birth of Person to Person Microfinance”, Innovations, pp. 31-58, Winter & Spring 2007.

Michael K. Hulme and Collette Wright, "Internet Based Social Lending: Past, Present and Future", Social Futures Observatory, Oct. 2006.
Richard W. Coleman, "Is the Future of the Microfinance Movement to be Found on the Internet?", International Trade and Finance Association Working Papers, 2007.
Amanda Scott and Patrick Towell, "The Web We Weave", Financial World, pp. 12-15, Nov. 2006.
Prosper, "Access and Transparency through Person-to-Person Lending," FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products,and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/554,659, filed Sep. 4, 2009, titled "System,Method, and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . . the Foreign Exchange Market in the United States, 1998, Federal Reserve Bank of new York.
Wolfe, Daniel, "An E-Variation on Payday Loan Theme", American Banker, Jul. 28, 2005.
Financial Advice Investment Money Oct. 1, 2009 at 5:50pm, HSBC Offshore Internet Banking.
Financial Advice Investment Money Oct. 1, 2009 at 7:52 am, HSBC Offshore Internet Banking.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
"Developing Asia and the World", Asian Development Bank 2002.
Microtrax Ltd., PC Electronic Payment Systems Reference Manual; 1995 (381 pages).
Caskey, John P. et al., "Is the Debit Card Revolution Finally Here", Federal Reserve Bank of Kansas City, Economic Review: Fourth Quarter 1994; pp. 70-95, vol. 79, #4 (17 pages).
Castaneda, Laura, "Business Promote Services to Customers Day In and Day Out", The Dallas Morning News, Nov. 26, 1994 (3 pages).
Mannix, Margaret, "Checkout Tech", U.S. News and World Report, Feb. 27, 1995, (6 pages).
"Credit Terminals to be Used at Canadian Liquor Outlets", Card News, Jan. 23, 1995, (1 page).
"Debit Card Popularity on the Rise," Chain Store Age Executive, Jan. 1994, (1 page).
"Debit Goes to Dinner", Credit Card Management, New York, Oct. 1994 (2 pages).
Peppard, Alan, "Down and Dirty in Deep Ellum," The Dallas Morning News, Dec. 3, 1994 (2 pages).
Everest Reference Manual, VeriFone Part No. 25399, Revision A, Manual Revision 1.0, Jul. 1995, (66 pages).
"Express Cards and Trains", Chain Store Age Executive Edition, Jan. 1995, (1 page).
Brown, Suzanne, "Goodnight Amy, Meg, Beth and Jo", Rocky Mountain News, Dec. 8, 1994 (1 page).
Klein, Robert J., "Here Comes the Debit Card", D& B Reports, Jul./Aug. 1990 (2 pages).
Hypercom S7C Advertisement, Chain Store Age, Sep. 1995 (4 pages).
Hypersom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment Systems for Supermarket Application User's Guide, Sep. 1996 (222 pages).
Fox, Linda A., "Keep an Eye on Your Credit Card," The Toronto Sun, Aug. 9, 1996 (1 page).
NCR 4430-5000 MSR/PIN User's Guide, 1994 (265 pages).
Nieman Marcus: High-Tech for the Holidays, Adweek, Dec. 5, 1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
"One Company's Diversification Shakes Up Peripherals Market", Chain Store Age, Jun. 1996 (3 pages).
O'Keefe, Michael, "Portable POS Terminal Mean Greater Convenience", Bank Systems & Technology, Nov. 1994 (2 pages).
"POS Terminal Can Handle Direct Debits", ABA Banking Journal, Sep. 1984 (2 pages).
Racel Corp. Advertisement, POS Terminal Eliminates Credit Card Vouchers, ABA Banking Journal, Nov. 1985 (2 pages).
Szabo, Joan C., "The Changing World of Financial Services", Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
Barnes, David B., VeriFone Introduces Everest (TM) Customer Activated Payment System to Multi-Lane Retail Market, OR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, VeriFone Part No. 00483-Revision D, Manual Revision 3.01, Apr. 1990 (144 pages).
Microtrax, Ltd. Omni 490 M (and 490ML) Operation Manual for Integrated and Non-Integrated Configurations, 1994 (60 pages).
Microtrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (280 pages).

IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park,NC, Jun. 1991 (429 pages).
Krino, Gary, et al., "A Birthday Card That Pays Off", The Orange County Register, Jul. 19, 1996 (2 pages).
Cohen, Bruce, "Alternative to Cash Gains Ground", The Financial Post, Apr. 22, 1994 (2 pages).
Bank of Boulder POS Debit Solution at the Table Now in Beta: First Bank to Certify IVI Spirit C2000 in MAPP (R), Busines Wire, Aug. 3, 1994 (1 page).
Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refunds Proceeds, Associated Systems and Computer Program Products".
Co-pending U.S. Appl. No. 12/700,681, filed Feb. 4, 2010, titled System and Computer Program Product to Issue a Retail Prepaid Card including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled "System, Program Product, and Method for Debit Card and Checking Account Autodraw".
Co-pending U.S. Appl. No. 12/877,524, filed Sep. 8, 2010, titled "System, Program Product, and Method for Debit Card and Checking Account Autodraw".
Co-pending U.S. Appl. No. 12/889,281, filed Sep. 23, 2010, titled "Computer-Implemented Methods, Computer Program Products, and Systems for Enhanced Loan Product Repayments".
Co-pending U.S. Appl. No. 12/892,847, filed Sep. 28, 2010, titled "Computer-Implemented Methods, Computer Program Products, and Systems for Management and Control of a Loyalty Rewards Network".
Co-pending U.S. Appl. No. 12/731,852, filed Mar. 25, 2010, titled "Machine, Program Product, and Computer Implemented Methods for Confirming a Mobile Banking Request".
Co-pending U.S. Appl. No. 13/036,076, filed Feb. 28, 2011, titled "Machine, Program Product, and Computer-Implemented Method to Construct a Person-To-Person Loan".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/397,113, filed Mar. 3, 2009, titled "Person-To-Person Lending Program Product, System, and Associated Computer-Implemented Methods".
Co-pending U.S. Appl. No. 12/338,365, filed Dec. 18, 2008, titled "Transfer Account Systems, Computer Program Products, and Associated Computer-Implemented Methods".
"Letter of Credit Explained: What is Letter of Credit?", Dec. 26, 2005, pp. 1-2.
VIPGift Received Investment from Summit Partners and Bridgescale Partners, Nov. 11, 2008, Chattanooga, TN and Palo Alto, CA.
Bank Deals—Best Rates and Deals: EverBank's World Currency CDs—My Interview with EverBank's Executive Frank Trotter, http://bankdeals.blogspot.com, Jul. 29, 2007.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Lazarus, David "120% rate for Wells' Advances", Oct. 16, 2004, San Francisco Chronicle (cited in Final Office Action in co-pending U.S. Appl. No. 12/338,684 dated Sep. 23, 2011).
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051, dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).

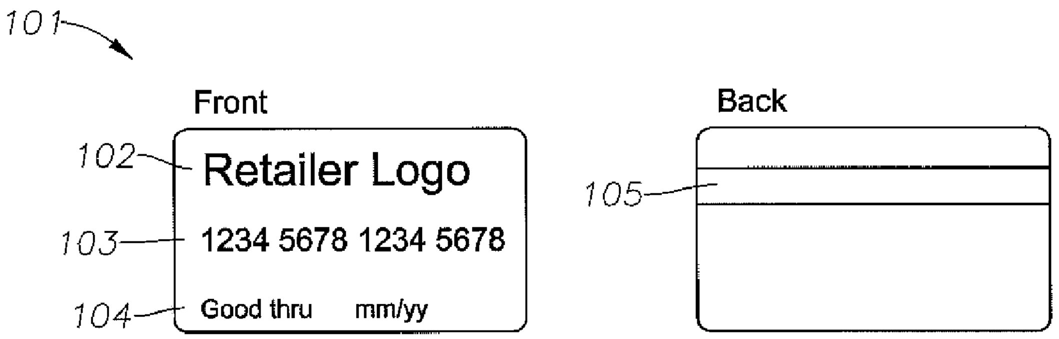
Fig. 1A
Fig. 1B
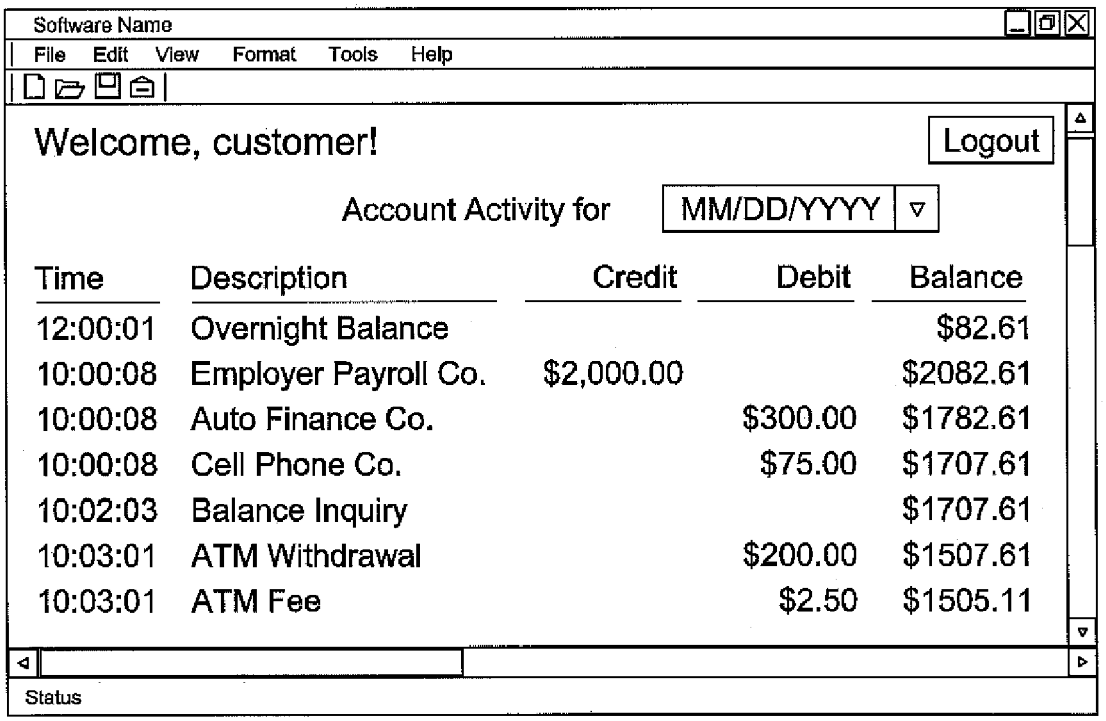
Fig. 2

```
HEADER|PAYEE FILE|11202007
ACCOUNT NUMBER|NAME|PAYMENT AMOUNT|PAYMENT DATE
20000000000003|JOHNSON, TIM|40.00
20000000000013|WILSON, GREG|60.00
20000000000006|MCDONALD, GEORGE|20.00
20000000000034|JONES, STELLA|20.00
20000000000002|SMITH, JANE|40.00
20000000000007|JONES, JOE|20.00
20000000000009|WATSON, KAREN|60.00
20000000000015|MONTGOMERY, MIKE|40.00
20000000000018|OLSON, RON|20.00
20000000000019|SAMUELSON, JULIE|40.00
TRAILER|10
```

Incoming ACH File

100

```
101 073972181 2739701160711200440A094101GALILEO                 Meta Payment Systems
5200ABC COMPANY                         1234567890PPDABCCOMPANY0711200711203241021000020001716
62207397218120000000000001   0000023853111111111     DOE, JOHN                0021000020453462
62207397218120000000000002   0000041560222222222     SMITH, JANE              0021000020453511
62207397218120000000000003   0000042636333333333     JOHNSON, TIM             0021000020453811
62207397218120000000000004   0000008972444444444     ROBINSON, MIKE           0021000020454190
62207397218120000000000005   0000042331555555555     WILSON, DAVE             0021000020454247
62207397218120000000000006   0000029405666666666     MCDONALD, GEORGE         0021000020454362
62207397218120000000000007   0000038565777777777     JONES, JOE               0021000020454465
62207397218120000000000008   0000040171888888888     SAMUELSON, SAM           0021000020454869
62207397218120000000000009   0000047327999999999     WATSON, KAREN            0021000020455259
62207397218120000000000010   0000036602101010101     WHITE, FRANK             0021000020455357
820000001000739721800000000000000000003514221234567890                         021000020001716
9000001000002000000100073972180000000000000000000351422
9999999999999999999999999999999999999999999999999999999999999999999999999999999999999999999999

9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
```

Outgoing ACH File

100

```
101 073972181 2739701160711200440A094101GALILEO                Meta Payment Systems
5200ABC COMPANY                          1234567890PPDABCCOMPANY0711200711203241021000020001716
62207397218120000000000001   0000023853111111111      DOE, JOHN               0021000020453462
62207397218120000000000002   0000041560222222222      SMITH, JANE             0021000020453511
62207397218120000000000003   0000042636333333333      JOHNSON, TIM            0021000020453811
62207397218120000000000004   0000008972444444444      ROBINSON, MIKE          0021000020454190
62207397218120000000000005   0000042331555555555      WILSON, DAVE            0021000020454247
62207397218120000000000006   0000029405666666666      MCDONALD, GEORGE        0021000020454362
62207397218120000000000007   0000038565777777777      JONES, JOE              0021000020454465
62207397218120000000000008   0000040171888888888      SAMUELSON, SAM          0021000020454869
62207397218120000000000009   0000047327999999999      WATSON, KAREN           0021000020455259
62207397218120000000000010   0000036602101010101      WHITE, FRANK            0021000020455357
820000001000739721800000000000000000003514221234567890                         021000020001716
5200LOAN COMPANY                         9876543210CCDLOANPAYMNT0711200711203241021000020001716
62707397218120000000000002   0000004000222222222      SMITH, JANE             0022222222222221
62707397218120000000000003   0000004000333333333      JOHNSON, TIM            0022222222222222
62707397218120000000000006   0000002000666666666      MCDONALD, GEORGE        0022222222222223
62707397218120000000000007   0000002000777777777      JONES, JOE              0022222222222224
62707397218120000000000009   0000006000999999999      WATSON, KAREN           0022222222222225
820000000500369860900000000180000000000000009876543210                         021000020001717
9000002000003000000150110958270000000018000000000351422
999999999999999999999999999999999999999999999999999999999999999999999999999999999999999999999

9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
9999999999999999999999999999999999999999999999999999999999999999999999999999999999999999999999
```

42

Figure 10:
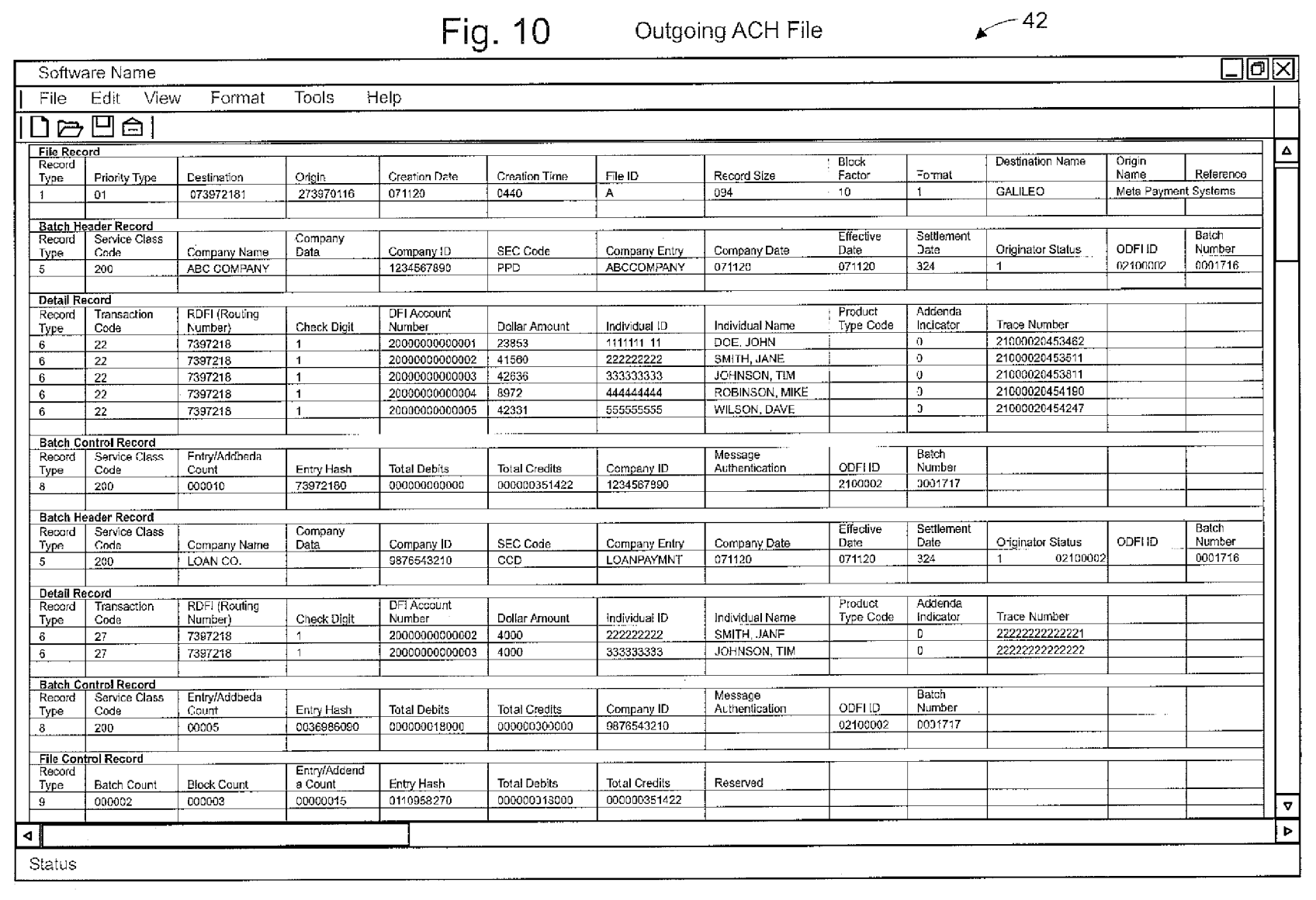

Fig. 10 Outgoing ACH File 42

Software Name

File Edit View Format Tools Help

File Record

| Record Type | Priority Type | Destination | Origin | Creation Date | Creation Time | File ID | Record Size | Block Factor | Format | Destination Name | Origin Name | Reference |
|---|---|---|---|---|---|---|---|---|---|---|---|---|
| 1 | 01 | 073972181 | 273970116 | 071120 | 0440 | A | 094 | 10 | 1 | GALILEO | Meta Payment Systems | |

Batch Header Record

| Record Type | Service Class Code | Company Name | Company Data | Company ID | SEC Code | Company Entry | Company Date | Effective Date | Settlement Date | Originator Status | ODFI ID | Batch Number |
|---|---|---|---|---|---|---|---|---|---|---|---|---|
| 5 | 200 | ABC COMPANY | | 1234567890 | PPD | ABCCOMPANY | 071120 | 071120 | 324 | 1 | 02100002 | 0001716 |

Detail Record

| Record Type | Transaction Code | RDFI (Routing Number) | Check Digit | DFI Account Number | Dollar Amount | Individual ID | Individual Name | Product Type Code | Addenda Indicator | Trace Number |
|---|---|---|---|---|---|---|---|---|---|---|
| 6 | 22 | 7397218 | 1 | 20000000000001 | 23853 | 1111111 11 | DOE, JOHN | | 0 | 21000020453462 |
| 6 | 22 | 7397218 | 1 | 20000000000002 | 41560 | 222222222 | SMITH, JANE | | 0 | 21000020453511 |
| 6 | 22 | 7397218 | 1 | 20000000000003 | 42636 | 333333333 | JOHNSON, TIM | | 0 | 21000020453811 |
| 6 | 22 | 7397218 | 1 | 20000000000004 | 8972 | 444444444 | ROBINSON, MIKE | | 0 | 21000020454190 |
| 6 | 22 | 7397218 | 1 | 20000000000005 | 42331 | 555555555 | WILSON, DAVE | | 0 | 21000020454247 |

Batch Control Record

| Record Type | Service Class Code | Entry/Addbeda Count | Entry Hash | Total Debits | Total Credits | Company ID | Message Authentication | ODFI ID | Batch Number |
|---|---|---|---|---|---|---|---|---|---|
| 8 | 200 | 000010 | 73972160 | 000000000000 | 000000351422 | 1234567890 | | 2100002 | 0001717 |

Batch Header Record

| Record Type | Service Class Code | Company Name | Company Data | Company ID | SEC Code | Company Entry | Company Date | Effective Date | Settlement Date | Originator Status | ODFI ID | Batch Number |
|---|---|---|---|---|---|---|---|---|---|---|---|---|
| 5 | 200 | LOAN CO. | | 9876543210 | CCD | LOANPAYMNT | 071120 | 071120 | 324 | 1 02100002 | | 0001716 |

Detail Record

| Record Type | Transaction Code | RDFI (Routing Number) | Check Digit | DFI Account Number | Dollar Amount | Individual ID | Individual Name | Product Type Code | Addenda Indicator | Trace Number |
|---|---|---|---|---|---|---|---|---|---|---|
| 6 | 27 | 7397218 | 1 | 20000000000002 | 4000 | 222222222 | SMITH, JANF | | 0 | 22222222222221 |
| 6 | 27 | 7397218 | 1 | 20000000000003 | 4000 | 333333333 | JOHNSON, TIM | | 0 | 22222222222222 |

Batch Control Record

| Record Type | Service Class Code | Entry/Addbeda Count | Entry Hash | Total Debits | Total Credits | Company ID | Message Authentication | ODFI ID | Batch Number |
|---|---|---|---|---|---|---|---|---|---|
| 8 | 200 | 00005 | 0036986090 | 000000018000 | 000000300000 | 9876543210 | | 02100002 | 0001717 |

File Control Record

| Record Type | Batch Count | Block Count | Entry/Addend a Count | Entry Hash | Total Debits | Total Credits | Reserved |
|---|---|---|---|---|---|---|---|
| 9 | 000002 | 000003 | 00000015 | 0110958270 | 000000313000 | 000000351422 | |

Status

TRANSFER ACCOUNT SYSTEMS, COMPUTER PROGRAM PRODUCTS, AND ASSOCIATED COMPUTER-IMPLEMENTED METHODS

RELATED APPLICATIONS

This application is a continuation of and claims the benefit and priority to U.S. patent application Ser. No. 12/338,365 titled "Transfer Account Systems, Computer Program Products, and Associated Computer-Implemented Methods filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, all of which are each incorporated herein by reference in their entireties. This application is also a continuation of and claims the benefit and priority to U.S. patent application Ser. No. 12/338,584 filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, all of which are each incorporated herein by reference in their entireties. This application also relates to U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed on Dec. 18, 2008; and U.S. application Ser. No. 12/389,749 filed on Feb. 29, 2009 titled "Methods to Advance Loan Proceeds On Prepaid Cards, Associated Systems and Computer Program Products, which claims priority and benefit to U.S. Provisional Patent Application Ser. No. 61/029,975 filed on Feb. 20, 2008 titled the same, each and all of which are incorporated herein by reference in their entireties.

FIELD OF INVENTION

The present invention relates generally to the financial service and banking industries, and, more particularly, to systems, computer program products, and associated computer-implemented methods of providing prioritized payments from proceeds of automatic deposits.

BACKGROUND

Today, a bank customer can authorize a loan provider to debit a customer's bank account, e.g., a checking, savings, money market, for a loan payment, or, more generally, a customer can authorize a creditor to debit the customer's bank account for a bill payment. Funds, however, may or may not be in the account at the time the creditor is authorized to debit the account or receive the funds from the account. Furthermore, the bank authorized to make the debit controls the order of presentment. This allows covering of an overdraft to the bank itself first or processing larger items early in the day in order to generate more overdraft fees when multiple smaller items are processed later in the day. Rather than bounce one big check, for example, banks may choose to bounce several smaller checks to generate extra fees.

It is known for banks to offer money management systems that have a money management account and a discretionary fund account in which bills are paid directly from the money management account on a customer-determined schedule, and excess funds beyond the customer's budget are transferred into the discretionary fund account. It is also known that such a money management system can be used in conjunction with loan payments. These offerings, however, still require the customer to determine a budget and schedule of payments. In addition, these offerings depend on the customer's discipline for not accessing the funds in the money management account, funds which are known to the customer and belong to the customer.

Other systems or methods include having an employer make loan payments on behalf of an employee directly out of payroll. Such solutions needlessly involve the employer in the finances of the employee, which can raise privacy concerns and introduce complexity into the payroll process.

Direct deposit proceeds, as the name implies, are often directly deposited into a bank customer's deposit account, also known as a checking account, savings account, or bank account. That is, a direct deposit is a payment that is electronically deposited into an individual's account at a depository institution. A direct deposit can be more generally known as an automatic deposit. Partially as a result of the situation with funds not being available to authorized creditors, among other reasons, many people simply do not have a traditional checking, savings, or other deposit account; they do not write checks. Instead, their automatic deposit proceeds, such as payroll and government benefits, typically are deposited into prepaid card accounts. Often these customers limit payments to available funds on a prepaid card.

SUMMARY OF INVENTION

Applicants have recognized numerous problems with current offerings for loan and other bill payments and one or more sources of these problems. For example, Applicants have recognized that it can be difficult for a creditor to be assured of payment for an authorized debit using a traditional bank account unless a customer is willing and able to balance or manage the deposit account, recording each and every deposit, check, Automated Teller Machine (ATM) withdrawal, and debit card transaction, including automatic withdrawals and bank fees. Also, from a customer's point of view, there is a need to be able to prioritize loan payments or other bill payments without having to balance a check book. That is, a customer may like, for example, to have his car payment debited from the proceeds of his payroll check immediately, rather than ever having access to the funds. Prioritized loan and bill payment can improve the customer's payment history and, thus, improve the customer's credit rating or credit score to thereby result in lower interest rates for the customer on any future loan. From a loan provider's perspective, there is great value in being able to prioritize loan payments. By reducing the risk of non-payment, in many cases substantially so, the loan provider should be able to offer more affordable loan products, benefiting both the loan provider and also loan customers. Payment prioritization, according to embodiments of the present invention, should reduce the risk of non-payment as compared to the risk that the source of the automatically deposited funds dries up (i.e., the worker's employment is terminated) or is redirected (i.e., the worker changes the automatic deposit routing).

In view of the foregoing, Applicants provide embodiments of transfer account systems, computer program product, and associated computer-implemented methods of providing prioritized payments from the proceeds of automatic deposits according to the present invention. According to embodiments of the present invention, for example, a transfer account acts as a new form of pass-through or sweep account, allowing automatic deposit funds to be intercepted and swept of prioritized loan or bill payments relatively instantaneously after the customer has access to the proceeds, resulting in the customer effectively having access only to any surplus funds, that is, the automatic deposits funds net of the prioritized payments.

According to embodiments of the present invention, various situations with recurring automatic deposit funds can benefit from a transfer account, including, for example, employer payroll funds to individuals, federal or state government electronic benefits payments to individuals, and bank-initiated payments to merchants for credit card sales. Recurring automatic deposit funds also include annuities, dividends, interest payments, lottery winnings, royalty payments, and other streams of payments as understood by those skilled in the art.

According to embodiments of the present invention, various types of payment on behalf of the customer can benefit from embodiments of the present invention, including, for example: (1) payments to a third-party (i.e., credit card, utility, cell phone bills) under a license agreement from the bank providing the transfer account; (2) a customer-initiated gift card purchase; (3) customer remittance of money to family located internationally or outside of a country; (4) loan payments to the bank providing the transfer account; (5) customer-initiated bill payment; (6) customer transfer of money to another transfer account customer, and others as understood by those skilled in the art. Note that, according to embodiments of the present invention, prioritized payments may be recurring or non-recurring events.

As understood by those skilled in the art, Automated Clearing House (ACH) is the name of an electronic network for financial transactions in the United States, regulated by the Federal Reserve. Embodiments of the present invention, for example, use standard ACH payments to receive the automatic deposit funds and to send the automatic deposit funds and prioritized payment information to another financial institution or prepaid card processor.

Embodiments of the present invention include a computer-implemented method of providing prioritized payments. Under the computer-implemented method, a financial institution enrolls customer accounts, whether prepaid card accounts or deposit accounts at another financial institution, in a prioritized payment program. As part of enrolling in the prioritized payment program, the customer pre-authorizes payment requests by one or more select creditors from the account. The financial institution computer maintains one or more lists of account identifiers for accounts enrolled in the program. Next, the financial institution computer receives an incoming ACH file, a batch file as understood by those skilled in the art, including one or more automatic deposits for an account enrolled in the prioritized payment program. The financial institution computer compares the account identifiers in the incoming ACH file with the maintained lists of enrolled account identifiers. For each account enrolled in the prioritized payment program with an unfilled pre-authorized payment request by a select creditor, the financial institution computer appends to an outgoing ACH file one or more prioritized payments responsive to the unfilled pre-authorized payment requests. The outgoing ACH file includes entries for the automatic deposit from the incoming ACH file and entries for the one or more prioritized payments, so that the automatic deposit is credited to the account and relatively instantaneously any prioritized payment to a select creditor is debited from the account, resulting in the customer effectively having access only to any surplus or net funds.

Embodiments of the present invention further include the generating of fees by the financial institution computer for the financial institution for the one or more prioritized payments from an account enrolled in the prioritized loan program to one or more select creditors when these prioritized payments are appended to the outgoing ACH file. Fees can be based per account, per transaction, per vendor, or otherwise as understood by those skilled in the art.

The embodiments of the present invention enable the offering of new products and promotions by requiring a customer to enroll in the prioritized payment program as a condition of a transaction. For example, a mobile phone provider's standard offer today, for example, can include a new phone for $100 upfront with a one-year service agreement at $75 per month. According to the embodiments of the present invention, a new offering can be a new phone for no upfront costs with one-year service agreement at $75 per month, with the agreement requiring the routing of payroll funds via automatic deposit to a transfer account and pre-authorization for the payment of the monthly bill. In this example, the mobile phone provider receives, as part of the service agreement, prioritized payment each month from the proceeds of the customer's automatic deposit.

In other embodiments of the present invention, a customer is required to enroll in the prioritized payment program as a condition of a loan. For example, a lending institution can offer a car loan to a customer having a low credit score and without a traditional deposit account if the customer will enroll in the prioritized payment program, including pre-authorizing loan payments to the lending institution and routing the customer's payroll deposit to a transfer account.

In yet another embodiment of the present invention, a bank can offer a merchant a discounted small business loan rate if the merchant will route the automatic deposit of the merchant's credit card receipts to a transfer account and allow that bank prioritized loan payments from the credit card receipts funds.

Embodiments of the present invention include computer program product to implement the methods described and shown. Embodiments of the present invention include a computer program product, stored on a tangible computer memory media that is readable by a computer, providing prioritized payments from the proceeds of automatic deposits, the computer program product comprising a set of instructions that, when executed by the computer, cause the computer to perform various operations. The operations include maintaining lists of account identifiers for accounts enrolled in a prioritized payment program by a financial institution, receiving an incoming ACH file by a financial institution, comparing the one or more of the account identifiers in the incoming ACH file with the maintained one or more lists of account identifiers for accounts enrolled in the prioritized payment program, and formulating one or more outgoing ACH files responsive to the incoming ACH file. In the event of a match between an account identifier on a list of accounts enrolled in the priority payment program and an account identifier in the incoming ACH file, the operations include appending to the outgoing ACH file one or more prioritized payments from an account enrolled in the prioritized payment program to one or more select creditors responsive to one or more unfilled pre-authorized payment requests by the one or more select creditors, so that the automatic deposit is credited to the account and relatively instantaneously any prioritized payment to the one or more select creditors is debited from the account. According to an embodiment of the present invention, the operations further include notifying a select creditor that the incoming ACH file includes one or more accounts enrolled in the prioritized payment program prompting a payment request by the select creditor.

In addition, embodiments of the present invention include systems, computer program products, and associated computer-implemented methods of providing prioritized payments for loan, bill, and other payments from the proceeds of automatic deposits as will be understood by those skilled in the art, so that a customer has effective access through the customer account or on a prepaid card only to a net value of funds.

BRIEF DESCRIPTION OF DRAWINGS

So that the manner in which the features and benefits of the invention, as well as others which will become apparent, may be understood in more detail, a more particular description of the invention briefly summarized above may be had by reference to embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIGS. 1A and 1B are respective front and back plan views of a prepaid card as used according to an embodiment of the present invention;

FIG. 2 is a front plan view of a display screen of a computer displaying an excerpt of an account activity statement according to an embodiment of the present invention;

FIG. 8 is an excerpt of an incoming ACH file with automatic deposits entries stored in memory of a computer and capable of being displayed on a display screen of a computer according to an embodiment of the present invention;

FIG. 9 is an excerpt of an outgoing ACH file with automatic deposits and prioritized payment entries stored in memory of a computer and capable of being displayed on a display screen of a computer according to another embodiment of the present invention;

FIG. 10 is an excerpt of an outgoing ACH file with headings stored in memory of a computer and being displayed on a display screen of a computer according to another embodiment of the present invention;

DETAILED DESCRIPTION OF INVENTION

Figure 3:
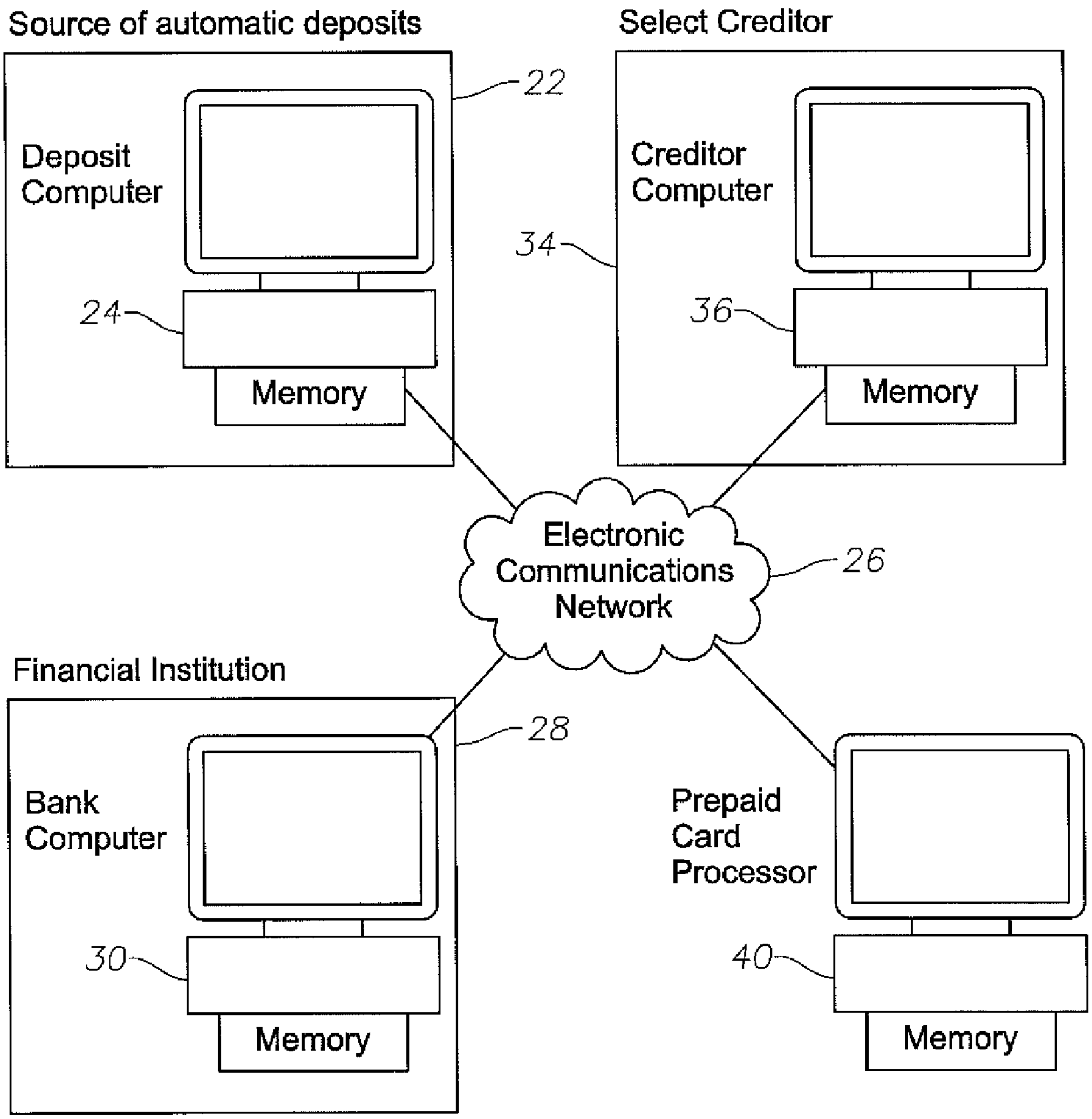
FIG. 3 is a schematic block diagram of a system to provide prioritized payments for a prepaid card account according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

One source of the problems with current offerings for loan and other bill payment, as recognized by Applicants, is that money, that can be accessed is often spent. The adage about money burning a hole in the pocket is apt. Although a bank customer can authorize a loan provider to debit the customer's deposit account for a loan payment, or, more generally, a customer can authorize a creditor to debit the customer's deposit account for a bill payment, there is no guaranty that the funds will still be available at the time of the request for payment. That is, a creditor can debit the customer's account too late, or too early if new funds have not been deposited. Applicants recognize that a preferred time for a debit is immediately after or relatively simultaneous with the receipt of a deposit, especially a recurring deposit such as payroll or government benefits.

Embodiments of the present invention, as illustrated in FIGS. 1A and 1B, for example, can include a prepaid card 101. As understood by those skilled in the art, prepaid cards can include a logo 102 associated with a provider or sponsor of the prepaid card and an expiration date 104. Prepaid cards 101 are typically associated with an account number 103, and a prepaid card account can often be reloaded with additional funds. Prepaid cards 101 often have a magnetic strip 105, as understood by those skilled in the art, and are coded so that the code received by a point of sale terminal or other interface processes the code so that a value is associated with the code, for example, to allow purchases with the prepaid card through a communications network 26, as illustrated in FIG. 3, to authorize payment from a bank or other financial institution through a prepaid card processor 40, and to decrement the value associated with the card 101.

Embodiments of the present invention, as illustrated in FIG. 2, include a display screen of a computer displaying an excerpt of an account activity statement for a customer account 110. The account activity statement can include a list of activities or transactions, sorted by one or more of the time 111, description 112, credit 113 (or deposit or addition), debit 114 (or withdrawal or subtraction), or balance 115. The account activity can provide for various periods of time, including a day (as shown in FIG. 2), a week, a month, or otherwise as understood by those skilled in the art. For example, the overnight balance 116 can be provided. Then a credit, such as, for example, an automatic payroll deposit 117A, can be listed. Debits, including prioritized payments, such as, for example, for a car payment 117B and a cell phone bill 117C, can be listed. Other transactions, such as, a balance inquiry 118, an ATM withdrawal 119, an ATM fee 120, or other fees and transactions as understood by those skilled in the art, can be listed. According to embodiments of the present invention, the automatic deposit is credited to the account and relatively instantaneously any prioritized payment to the one or more select creditors is debited from the account (as illustrated in the time column 111 for transactions 117A, 117B, and 117C) so that the customer effectively has access to only the surplus funds.

Figure 4:
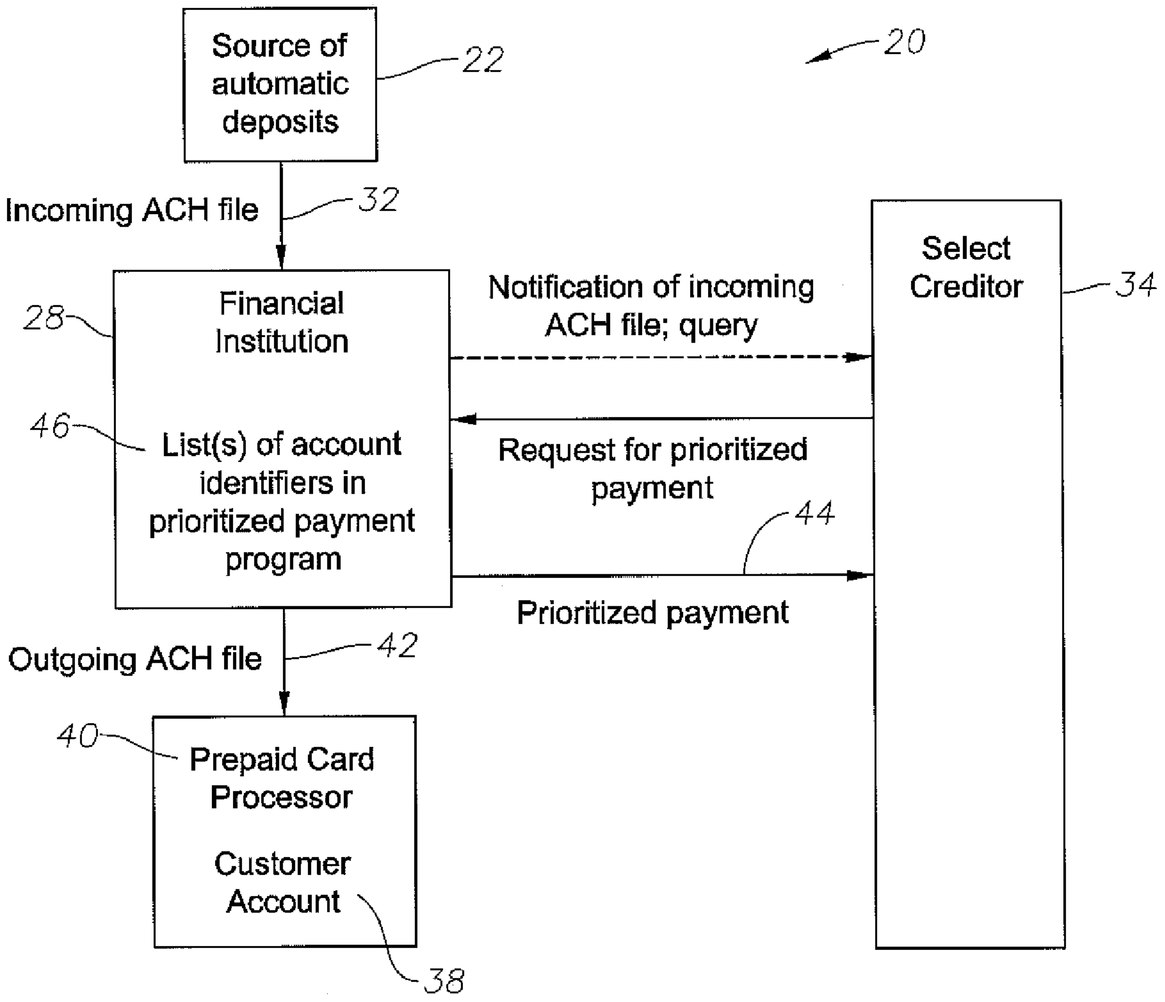
FIG. 4 is a schematic flow diagram of a system to provide prioritized payments for a prepaid card account according to another embodiment of the present invention.
Figure 5:
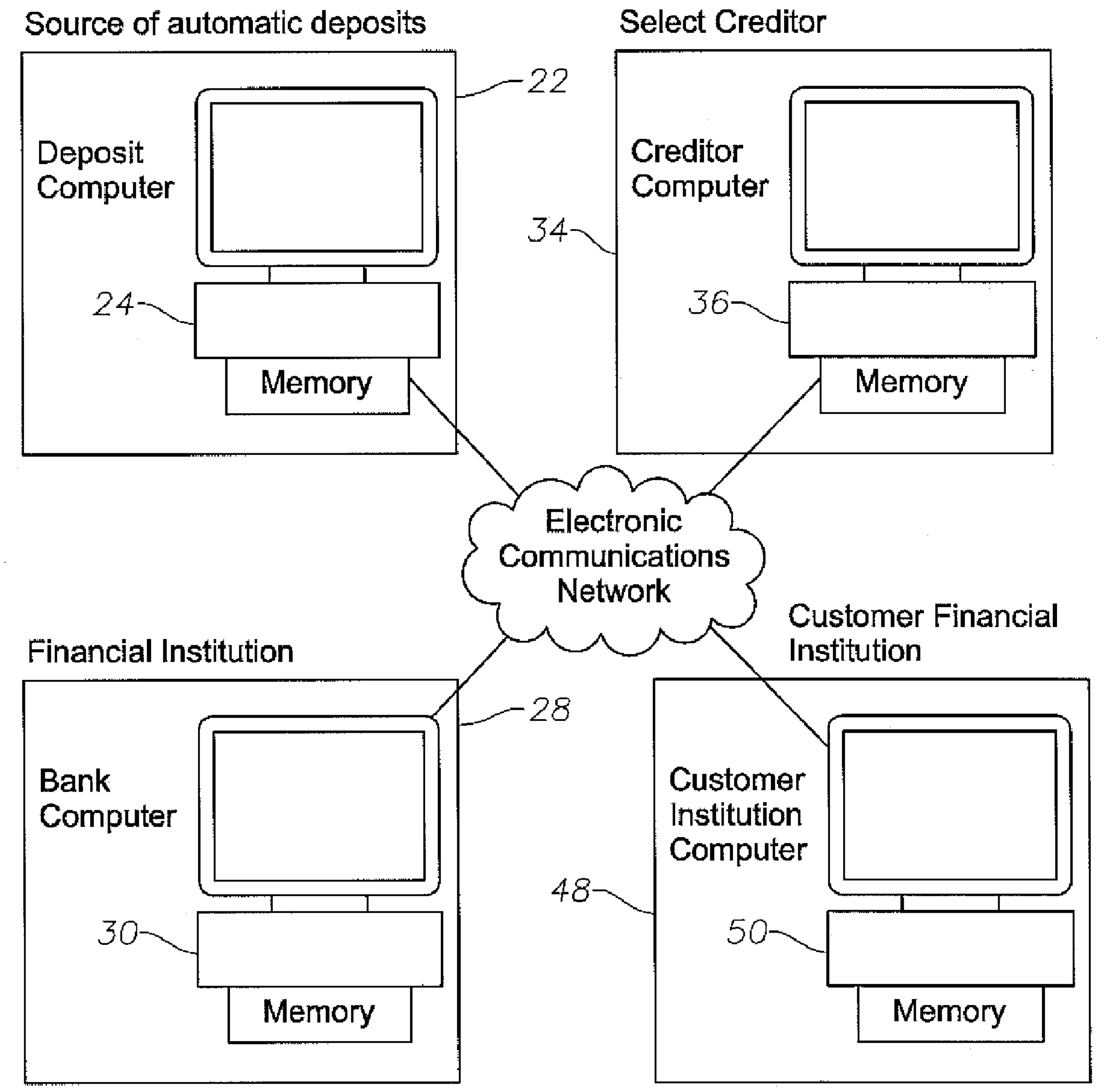
FIG. 5 is a schematic block diagram of a system to provide prioritized payments for a customer bank account according to an embodiment of the present invention.
Figures 6, 7:
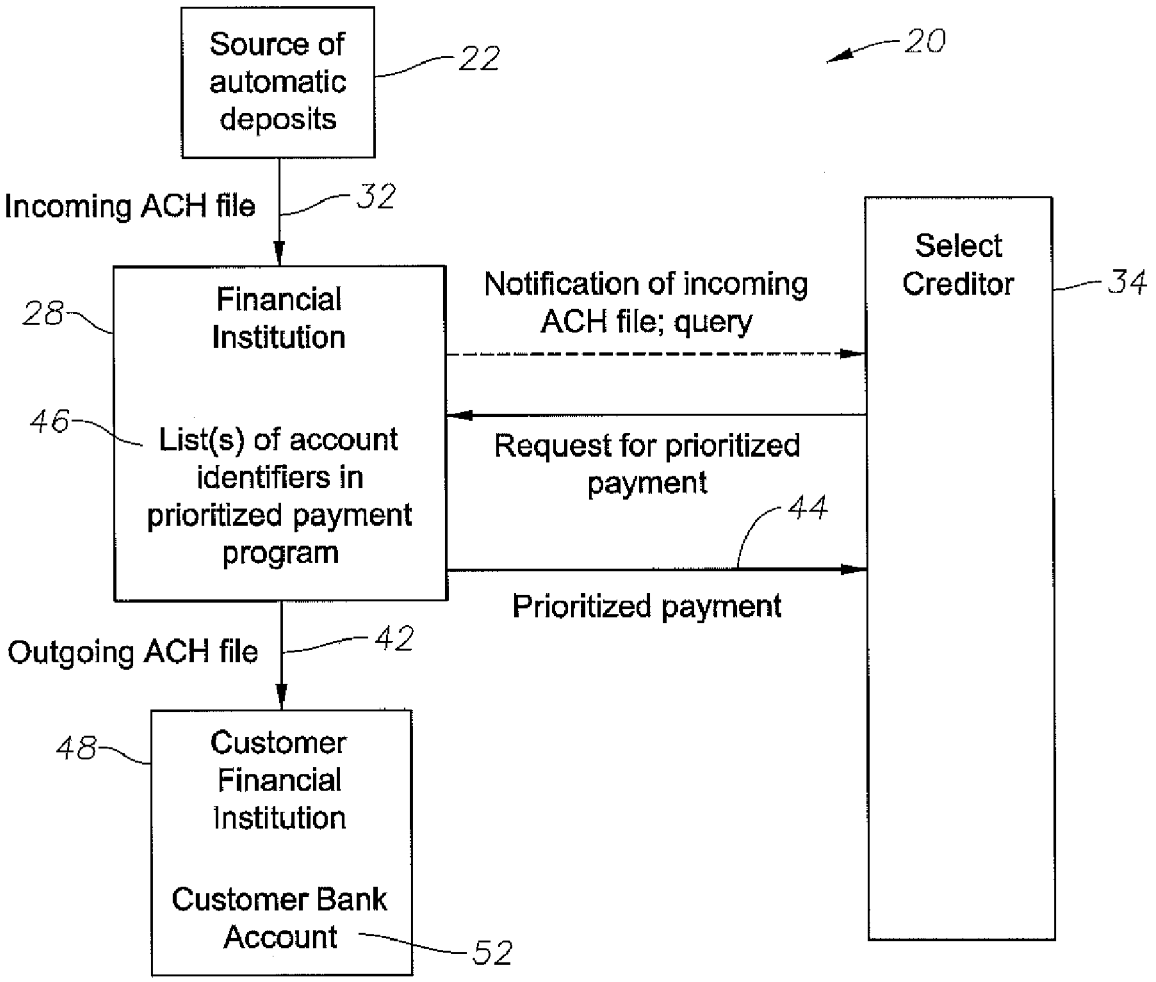
FIG. 6 is a schematic flow diagram of a system to provide prioritized payments for a customer bank account according to an embodiment of the present invention.
FIG. 7 is a partial list of prepaid card account identifiers for accounts enrolled in a prioritized payment program by a financial institution stored in memory of a computer and capable of being displayed on a display screen of a computer according to an embodiment of the present invention.

Embodiments of the present invention, as illustrated in FIGS. 3 and 4, for example, include bundling an entry for an automatic deposit with an entry for a prioritized payment to a select creditor in the same ACH file 42 directed to a prepaid card processor 40, so that the automatic deposit is credited to the customer prepaid card account 38 and relatively instantaneously any prioritized payment 44 to the select creditor 34 is debited from the account. In another embodiment of the present invention, as illustrated in FIGS. 5 and 6, for example, the ACH file 42 is directed to a customer financial institution 48 associated with a customer bank account 52.

FIGS. 9 and 10 illustrate an excerpt of such an ACH file 42 according to an embodiment of the present invention. FIG. 10, for example, includes heading information in the ACH file 42 for illustration purposes. For the automatic deposit entries, the ACH file 42 includes a record type 42A, a transaction code 42B, routing number 42C, check digit 42D, a DFI account number 42E, the dollar amount 42F, an individual ID 42G, individual name 42H, product type code 42I, addenda indicator 42J, and trace number 42K, as understood by those skilled in the art. Likewise, all of this information is included for the prioritized payment entries. As illustrated in FIG. 10, an ACH file 42, for example, may be a batch file, as understood by those skilled in the art. With this information and organization, according to embodiments of the present invention, the prepaid card processor 40 or the customer financial institution 48 processes the ACH file 42 so that the automatic deposit is credited to the customer account and relatively instantaneously any prioritized payment 44 to the select creditor 34 is debited from the account.

By offering prioritized payments, the embodiments of the present invention enable the offering of new products and promotions. According to the embodiments of the present invention, these new products and promotions can require a customer to enroll in the prioritized payment program as a condition of a transaction. The financial institution 28 maintains the list(s) of accounts enrolled in the prioritized payment program 46. Therefore, a utility customer can receive a discounted rate, as understood by those skilled in the art, if the utility company receives a prioritized payment 44 each month from the proceeds of the customer's payroll, a source of an automatic deposit 22, according to the embodiments of the present invention.

In an exemplary embodiment of the present invention, a customer is required to enroll in the prioritized payment program as a condition of a loan. The financial institution 28 maintains the list(s) of accounts enrolled in the prioritized payment program 46. In another exemplary embodiment of the present invention, a merchant is eligible for a discounted small business loan rate if the merchant routes the automatic deposit of the merchant's credit card receipts to a transfer account and allows that bank prioritized loan payments 44 from the credit card receipts funds. As understood by those skilled in the art, credit card receipts are a source of automatic deposits 22. Embodiments of the present invention provide, for example, for credit or a loan from the financial institution defining a first financial institution or by a second financial institution different and remote from the first financial institution. That is, the financial institution can provide the transfer account and related products and services in conjunction with its own efforts to extend credit or in conjunction with lending and credit efforts by another financial institution or institutions.

FIG. 8 illustrates an excerpt of an incoming ACH file 32 with automatic deposit entries stored in memory of a computer and capable of being displayed on a display screen of a computer, as received by the financial institution 28. As understood by those skilled in the art, the incoming ACH file 32 includes header and batch information 100 about the ACH file, such as origin, destination, and record size and type. The incoming ACH file 32 is a batch file with multiple entries for automatic deposits, for example, from ABC COMPANY to various individuals, such as DOE, JOHN, at various institutions according to an embodiment of the present invention.

Figure 12:
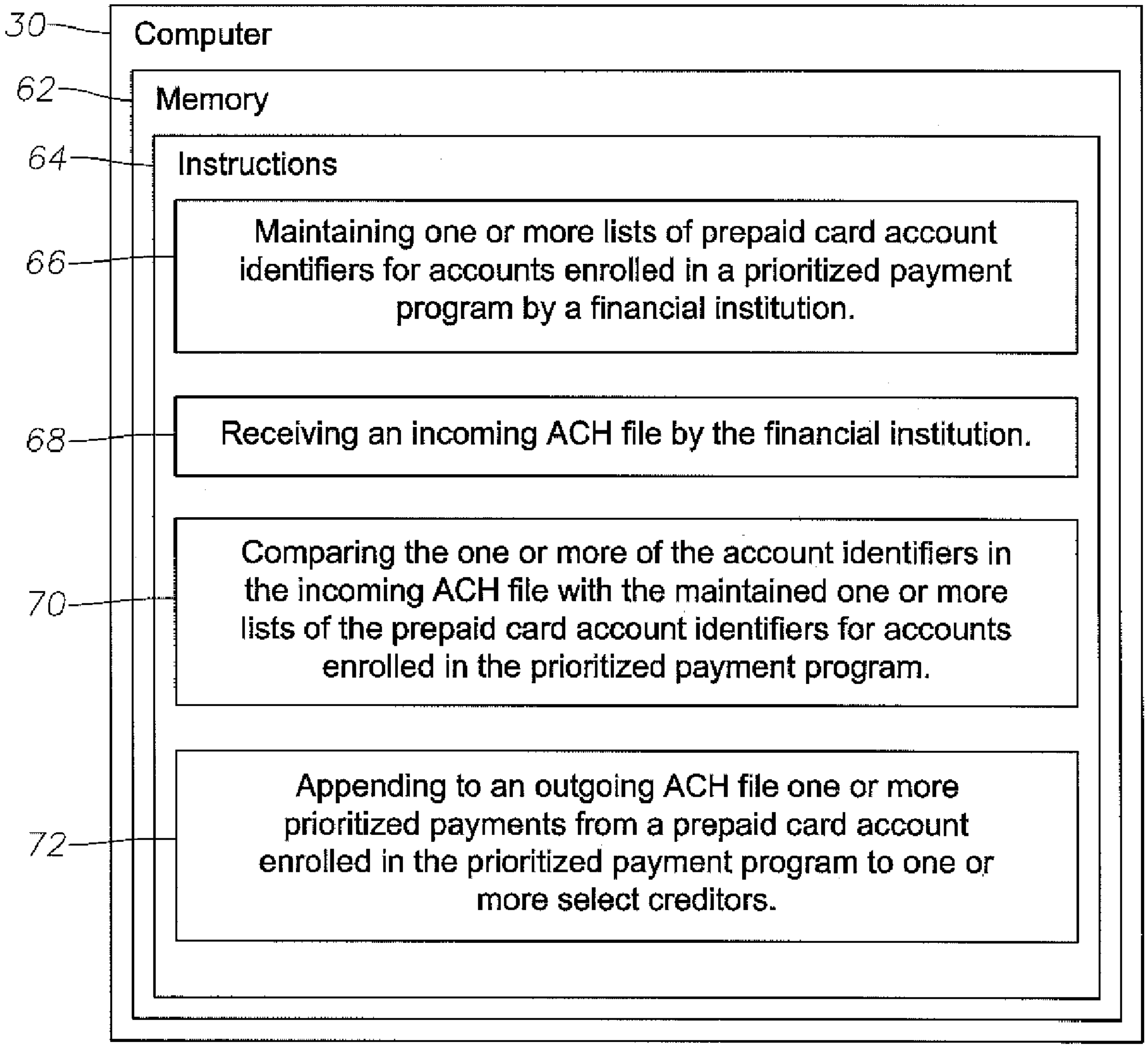
FIG. 12 is a schematic diagram of a program product stored in memory and executable by a computer according to an embodiment of the present invention.
Figure 14:
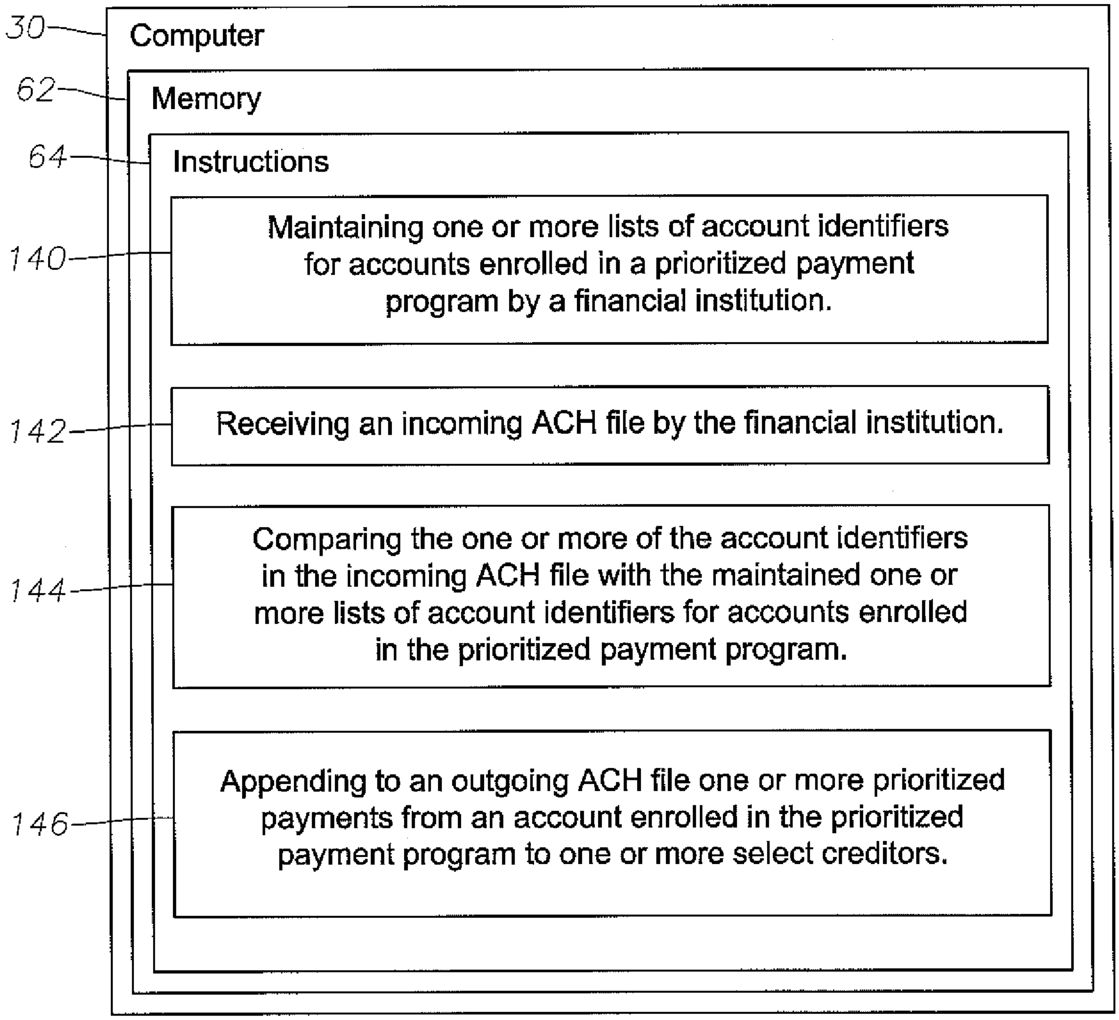
FIG. 14 is a schematic diagram of a program product stored in memory and executable by a computer according to another embodiment of the present invention.

According to embodiments of the present invention, a computer program product 64, as illustrated in FIGS. 12 and 14, associated with the financial institution computer 30, stored on a tangible computer memory media 62, and operable on a computer 30. The computer program product, for example, includes a set of instructions 64 that, when executed by the computer, cause the computer to perform various operations as described herein. The computer program product 64 can maintain one or more lists of accounts enrolled in the prioritized payment program by a financial institution (blocks 66, 140). FIG. 7 illustrates an example of such a list, according to embodiments of the present invention. After receiving the incoming ACH file by the financial institution (blocks 68, 142), the computer program product, according to an embodiment of the present invention, compares the accounts in the incoming ACH file with the maintained lists (blocks 70, 144). Then, the computer program product, according to an embodiment of the present invention, formulates one or more outgoing ACH files 42, responsive to the incoming ACH file 32, and appends to the file a prioritized payment 44 from an account enrolled in the prioritized payment program to a select creditor 34 (blocks 72, 146) in the event of an unfilled pre-authorized payment request by a creditor computer 36. This, for example, transforms the file from one type to a different file type. Therefore, according to embodiments of the present invention, the automatic deposit is credited to the customer bank account 52 or prepaid card account 38 and relatively instantaneously the prioritized payment to the creditor computer is debited from the same account.

According to embodiments of the present invention, sources of automatic deposits 22 include: employer-initiated direct deposit of payroll, a federal or state government-initiated electronic transfer of benefits payment, and a bank-initiated payment to a merchant for credit card sales. According to embodiments of the present invention, recurring automatic deposits funds also include annuities, dividends, interest payments, lottery winnings, royalty payments, and other streams of payments as understood by those skilled in the art.

Figure 11:
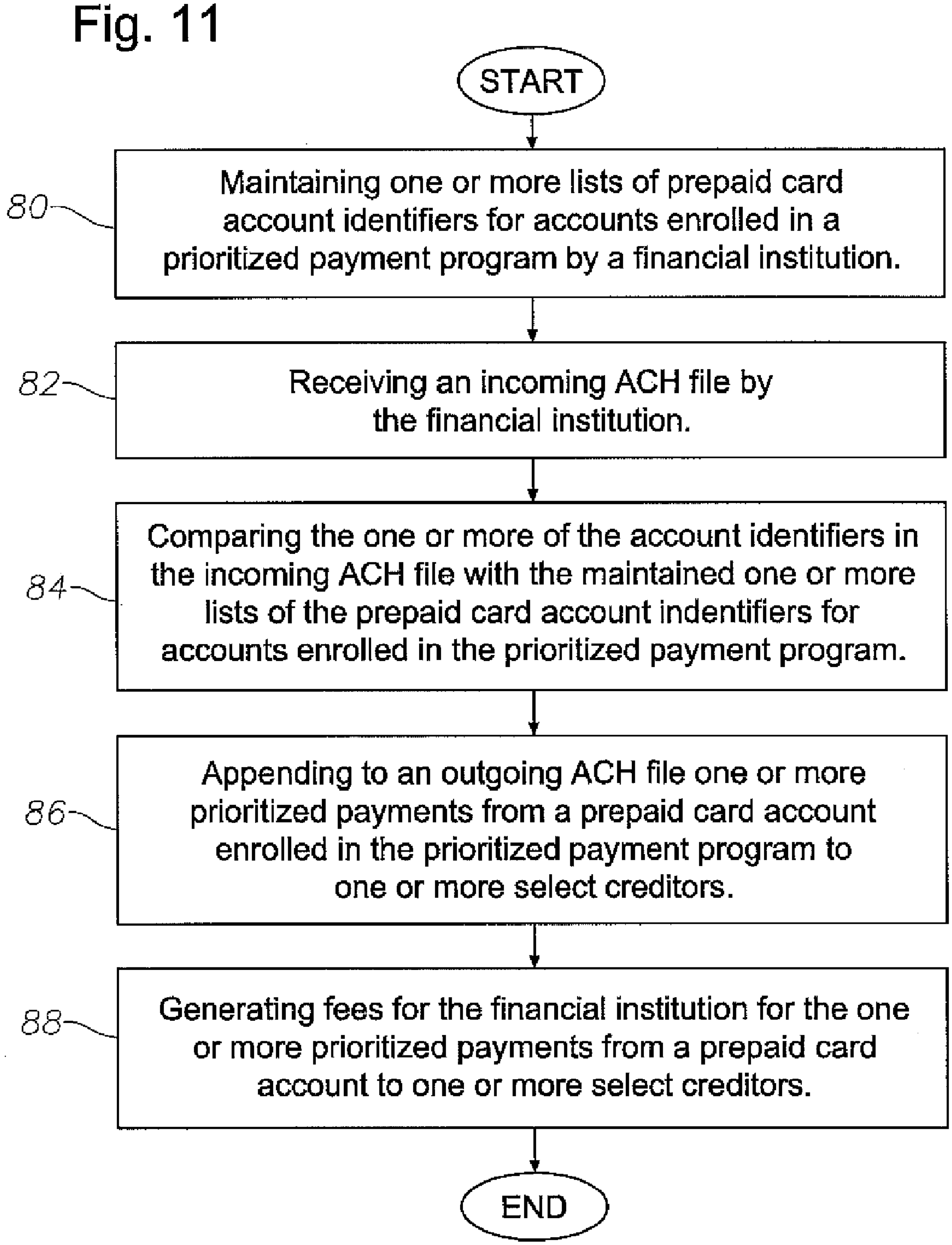
FIG. 11 is a flow diagram of a computer-implemented method of prioritized payments according to an embodiment of the present invention.
Figure 13:
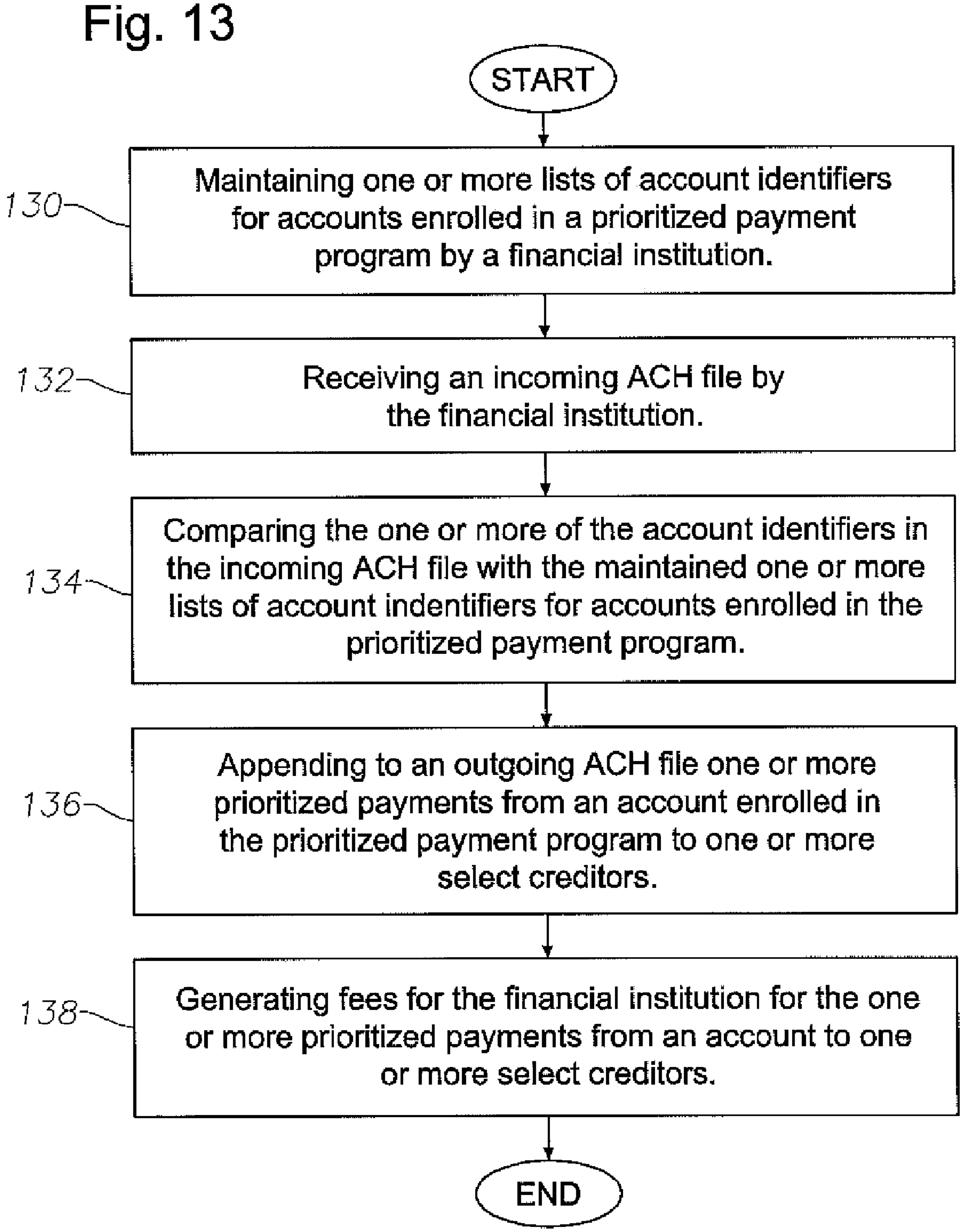
FIG. 13 is a flow diagram of a computer-implemented method of prioritized payments according to another embodiment of the present invention.

Embodiments of the present invention include computerized or computer-implemented methods of providing prioritized payments, as illustrated in FIGS. 11 and 13. According to embodiments of the present invention, for example, a financial institution enrolls customer accounts by use of a computer and flagging or identifying the customer as an enrollee, whether prepaid card accounts (see FIG. 11) or deposit accounts at another financial institution (see FIG. 13), in a prioritized payment program. As part of enrolling in the prioritized payment program, the customer pre-authorizes payment requests by one or more select creditors from the account. The financial institution computer maintains one or more lists of account identifiers for accounts enrolled in the program (blocks 80, 130). Next, the financial institution computer receives an incoming ACH file (blocks 82, 132), for example, in the form of a batch file as understood by those skilled in the art, including one or more automatic deposits for an account enrolled in the prioritized payment program. The financial institution computer has instructions stored in memory that compare the account identifiers in the incoming ACH file with the maintained lists of enrolled account identifiers (blocks 84, 134). For each account enrolled in the prioritized payment program with an unfilled pre-authorized payment request by a select creditor, the financial institution computer appends to an outgoing ACH file one or more prioritized payments responsive to the unfilled pre-authorized payment requests (blocks 86, 136). The new outgoing ACH file includes entries for the automatic deposit from the incoming ACH file and entries for the prioritized payments, so that the automatic deposit is credited to the account and relatively instantaneously any prioritized payment to a select creditor is debited from the account, resulting in the customer effectively having access only to any surplus funds. In addition, the financial institution computer has instructions that generate fees for the prioritized payments (blocks 88, 138); the fees can be based per account, per transaction, per vendor, or otherwise as understood by those skilled in the art.

Embodiments of the present invention also provide a system 20 to provide prioritized payments from the proceeds of an automatic deposit to a prepaid card account, as illustrated in FIGS. 3 and 4. The system 20 includes a first computer associated with a source of automatic deposits 22, defining a deposit computer 24. The deposit computer provides information for an automatic deposit for a customer through an electronic communications network 26. The system 20 also includes one or more second computers associated with a financial institution 28, defining a bank computer 30, in communication with the deposit computer 24 through the electronic communications network 26. The bank computer receives and processes an ACH file 32 including the information for the automatic deposit for the customer from the deposit computer 24. The bank computer includes software as illustrated in FIGS. 12 and 14 and discussed below. The system 20 further includes a third computer associated with a select creditor 34, defining a creditor computer 36, in communication with the bank computer 30 through the electronic communications network 26. As part of enrolling in the prioritized payment program, the customer pre-authorizes certain requests by the creditor computer 36 and routes the automatic deposits from the source of automatic deposits 22 to the bank computer 30 associated with the financial institution 28 having the prioritized payment program. The creditor computer 36, in turn, has instructions to request a prioritized payment from the bank computer 30 and receive a prioritized payment 44 from the customer as described below. The system 20 also includes a fourth computer associated with a customer prepaid card account 38 defining a prepaid card processor 40 as understood by those skilled in the art. The prepaid card processor receives an outgoing ACH file 42 from the bank computer 30 through the electronic communications network 26 and, responsive to the ACH file, credits the automatic deposit proceeds to the prepaid card account 38 and debits relatively instantaneously any prioritized payment 44 to the creditor computer 36 from the prepaid card account 38 through the electronic communications network 26. In turn, this movement of data based on instructions stored on the respective computers allows the display of data to a customer or merchant on available funds, e.g., based on a load on a prepaid card, to show only available funds after the prioritized payment deductions have occurred responsive to the instructions.

Embodiments of the present invention also provide a system 20 to provide prioritized payments from the proceeds of an automatic deposit to a customer bank account, as illustrated in FIGS. 5 and 6. The system 20 includes a first computer associated with a source of automatic deposits 22, defining a deposit computer 24. The deposit computer provides information for an automatic deposit for a customer through an electronic communications network 26. The system 20 also includes second computer associated with a financial institution 28, defining a bank computer 30, in communication with the deposit computer 24 through the electronic communications network 26. The bank computer receives and processes an ACH file 32 including the information for the automatic deposit for the customer from the deposit computer 24. The bank computer includes software or program product stored in memory as instructions and executable by the computer as illustrated in FIGS. 12 and 14 and discussed below. The system 20 further includes a third computer associated with a select creditor 34, defining a creditor computer 36, in communication with the bank computer 30 through the electronic communications network 26. As part of enrolling in the prioritized payment program, the customer pre-authorizes certain requests by the creditor computer 36 and routes the automatic deposits from the source of automatic deposits 22 to the bank computer 30 associated with the financial institution 28 having the prioritized payment program. The creditor computer 36 can request a prioritized payment from the bank computer 30 and receive a prioritized payment 44 from the customer as described below. The system 20 also includes a fourth computer a second financial institution 28 associated with a customer bank account 52 defining a customer institution computer 50. The customer institution computer 50 receives an outgoing ACH file 42 from the bank computer 30 through the electronic communications network 26 and, responsive to the ACH file, credits the automatic deposit proceeds to the customer bank account 52 and debits relatively instantaneously any prioritized payment 44 to the creditor computer 36 from the customer bank account 52 through the electronic communications network 26.

In addition, the embodiments of the present invention include a computer program product, as illustrated in FIGS. 12 and 14, associated with the bank computer, stored on a tangible computer memory media 62, operable on a computer 30. Embodiments of the computer program can include, for example, modules adapted to perform one or more operations. The computer program product, for example, includes a set of instructions 64 that, when executed by the computer, cause the computer to perform various operations as described herein. The operations can include maintaining one or more lists 46 of account identifiers for accounts enrolled in a prioritized payment program by the financial institution 28 (blocks 66, 140). The operations also include receiving an incoming ACH file 32 by the bank computer 30 (blocks 68, 142). The ACH file 32 includes one or more account identifiers associated with an automatic deposit, for example, an automatic deposit destined for a prepaid card account 38. The operations further include comparing the account identifiers in the incoming ACH file 32 with one or more maintained lists 46 of account identifiers for accounts enrolled in the prioritized payment program (blocks 70, 144). The operations also include appending to an outgoing ACH file 42, responsive to the incoming ACH file 32, a prioritized payment 44 from an account enrolled in the prioritized payment program to the select creditor computer 36 (blocks 72, 146), so that the automatic deposit is credited to the customer account 38 and relatively instantaneously the prioritized payment to the creditor computer is debited from the account 38.

A person having ordinary skill in the art will recognize that various types of memory are readable by a computer such as described herein, e.g., deposit source computer, bank computer, credit computer, prepaid card processors, or other computers with embodiments of the present invention so that instruction stored in such memory are executable and cause various operations within the computer. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions stored therein, as well as instructions related to the system and the method steps described above and can operate on a computer. It will be understood by those skilled in the art that such media can be at other locations instead of or in addition to the bank to store program products, e.g., including software, thereon. Embodiments of a system for providing prioritized payments, for example, can include a plurality of customer access interface devices as illustrated and described herein and one or more remote computer servers positioned to provide communication with each of the plurality of customer access interface devices and being associated with a financial institution. Each of these computer servers, for example, can having one or more of these various types of memory as understood by those skilled in the art.

This application is a continuation of and claims the benefit and priority to U.S. patent application No. Ser. 12/338,365 titled "Transfer Account Systems, Computer Program Products, and Associated Computer-Implemented Methods filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, all of which are each incorporated herein by reference in their entireties. This application is also a continuation of and claims the benefit and priority to U.S. patent application Ser. No. 12/338,584 filed on Dec. 18, 2008, which claims priority to and the benefit of U.S. Provisional Patent Application Ser. No. 61/016,213, by Sorbe et al., titled "Transfer Account Systems, Computer Program Products, and Associated Methods" filed Dec. 21, 2007, and U.S. Provisional Patent Application Ser. No. 61/052,454, by Sorbe et al., titled "Transfer Account Systems, Computer Program Products, and Methods to Prioritize Payments from Preselected Bank Account" filed May 12, 2008, all of which are each incorporated herein by reference in their entireties. This application also relates to U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed on Dec. 18, 2008; and U.S. application Ser. No. 12/389,749 filed on Feb. 29, 2009 titled "Methods to Advance Loan Proceeds On Prepaid Cards, Associated Systems and Computer Program Products, which claims priority and benefit to U.S. Provisional Patent Application Ser. No. 61/029,975 filed on Feb. 20, 2008 titled the same, each and all of which are incorporated herein by reference in their entireties.

That claimed is:

1. A computer-implemented method to provide prioritize payments from proceeds of automatic deposits, the method comprising the steps of:

creating, by a computer associated with a financial institution to define a financial institution computer, an intermediary account for each of a plurality of enrollees enrolled in prioritize payments with the financial institution, each of the intermediary accounts inaccessible by the plurality of enrollees and adapted to receive funds for a benefit of one or more of the plurality of enrollees so that debits from funds received by the intermediary accounts are adapted to be provided to one or more customer accounts associated with one or more of the plurality of enrollees and one or more preauthorized payments to one or more creditors selected by the one or more of the plurality of enrollees to define one or more select creditors;

identifying, by the financial institution computer, one or more identifier from a received incoming ACH file associated with one or more of the plurality enrollees, the one or more identifiers being associated with one or more automatic deposits; and appending, by the financial institution computer, to the received incoming ACH file one or more unfilled preauthorized payments to one or more select creditors to define one or more prioritized payments to thereby create an outgoing ACH file so that the one or more prioritized payments is adapted to be deducted from the one or more automatic deposits associated with the one or more identifier from one or more intermediary accounts associated with the one or more automatic deposits, the outgoing ACH file further being adapted so that a balance of the one or more automatic deposits is adapted to be credited to the one or more customer accounts associated with the one or more of the plurality of enrollees.

2. A computer-implemented method as defined in claim 1, wherein one or more of the unfilled payments are initiated in response to a query from the financial institution computer to a second computer associating with the one or more select creditors, the second computer positioned remote from the financial institution computer.

3. A computer-implemented method as defined in claim 1, wherein enrollment for the prioritized payment is required as a condition of a loan and wherein the one or more customer accounts are remote from the financial institution computer.

4. A computer-implemented method as defined in claim 1, wherein the one or more customer accounts are one or more prepaid card accounts associated with one or more prepaid card processors positioned remote from the financial institution computer.

5. A computer-implemented method as defined in claim 1, the method further comprising: determining, responsive to the identifying step, whether the one or more automatic deposits is associated with one or more unfilled preauthorized payments to one or more select creditors, and wherein the appending step is responsive to determining whether the one or more automatic deposits is associated with one or more unfilled preauthorized payments.

6. A computer-implemented method as defined in claim 1, wherein the balance is the one or more automatic deposits less the one or more prioritized payments and less a fee for the financial institution.

7. A computer associated with a financial institution to define a financial institution computer to provide prioritize payments from proceeds of automatic deposits, computer comprising:

one or more input/output unit for communicating with a plurality of second computers;

one or more processors; and one or more non-transitory memories encoded with computer program and operable by the one or more processors so that during operations thereof a financial institution computer performs the operations of:

creating an intermediary account for each of a plurality of enrollees enrolled in prioritize payments with the financial institution, each of the intermediary accounts inaccessible by the plurality of enrollees and adapted to receive funds for a benefit of one or more of the plurality of enrollees so that debits from funds received by the intermediary accounts are adapted to be provided to one or more customer accounts associated with one or more of the plurality of enrollees and one or more preauthorized payments to one or more creditors selected by the one or more of the plurality of enrollees to define one or more select creditors;

identifying one or more identifier from a received incoming ACH file associated with one or more of the plurality enrollees, the one or more identifiers being associated with one or more automatic deposits; and appending to the received incoming ACH file one or more unfilled preauthorized payments to one or more select creditors to define one or more prioritized payments to thereby create an outgoing ACH file so that the one or more prioritized payments is adapted to be deducted from the one or more automatic deposits associated with the one or more identifier from one or more intermediary accounts associated with the one or more automatic deposits, the outgoing ACH file further being adapted so that a balance of the one or more automatic deposits is adapted to be credited to the one or more customer accounts associated with the one or more of the plurality of enrollees.

8. A financial institution computer as defined in claim 7, wherein one or more of the unfilled payments are initiated in response to a query to a second computer associating with the one or more select creditors, the second computer positioned remote from the financial institution computer.

9. A financial institution computer as defined in claim 7, wherein enrollment for the prioritized payment is required as a condition of a loan and wherein the one or more customer accounts are remote from the financial institution computer.

10. A financial institution computer as defined in claim 7, wherein the one or more customer accounts are one or more prepaid card accounts associated with one or more prepaid card processors positioned remote from the financial institution computer.

11. A financial institution computer as defined in claim 7, the financial institution computer further performing the operation of: determining, responsive to the identifying step, whether the one or more automatic deposits is associated with one or more unfilled preauthorized payments to one or more select creditors, and wherein the appending step is responsive to determining whether the one or more automatic deposits is associated with one or more unfilled preauthorized payments.

12. A financial institution computer as defined in claim 7, wherein the balance is the one or more automatic deposits less the one or more prioritized payments and less a fee for the financial institution.

13. Non-transitory medium encoded with computer program to provide prioritize payments from proceeds of automatic deposits and operable on a computer associated with a financial institution to define a financial institution computer, the computer program comprising the following instructions:

creating an intermediary account for each of a plurality of enrollees enrolled in prioritize payments with the financial institution, each of the intermediary accounts inaccessible by the plurality of enrollees and adapted to receive funds for a benefit of one or more of the plurality of enrollees so that debits from funds received by the intermediary accounts are adapted to be provided to one or more customer accounts associated with one or more of the plurality of enrollees and one or more preauthorized payments to one or more creditors selected by the one or more of the plurality of enrollees to define one or more select creditors;

identifying one or more identifier from a received incoming ACH file associated with one or more of the plurality enrollees, the one or more identifiers being associated with one or more automatic deposits; and appending to the received incoming ACH file one or more unfilled preauthorized payments to one or more select creditors to define one or more prioritized payments to thereby create an outgoing ACH file so that the one or more prioritized payments is adapted to be deducted from the one or more automatic deposits associated with the one or more identifier from one or more intermediary accounts associated with the one or more automatic deposits, the outgoing ACH file further being adapted so that a balance of the one or more automatic deposits is adapted to be credited to the one or more customer accounts associated with the one or more of the plurality of enrollees.

14. Non-transitory memory as defined in claim 13, wherein one or more of the unfilled payments are initiated in response to a query to a second computer associating with the one or more select creditors.

15. Non-transitory memory as defined in claim 13, wherein enrollment for the prioritized payment is required as a condition of a loan.

16. Non-transitory memory as defined in claim 13, wherein the one or more customer accounts are one or more prepaid card accounts associated with one or more prepaid card processors.

17. Non-transitory memory as defined in claim 13, the computer program further comprising the instruction of: determining, responsive to the identifying step, whether the one or more automatic deposits is associated with one or more unfilled preauthorized payments to one or more select creditors, and wherein the appending step is responsive to determining whether the one or more automatic deposits is associated with one or more unfilled preauthorized payments.

18. Non-transitory memory as defined in claim 13, wherein the balance is the one or more automatic deposits less the one or more prioritized payments and less a fee for the financial institution.

19. Non-transitory memory as defined in claim 13, wherein the one or more select creditors includes at least a second financial institution different and remote from the financial institution.

20. Non-transitory memory as defined in claim 13, wherein the one or more select creditors are associated with a second financial institution different and remote from the financial institution; and wherein the prioritized payments include customer-initiated payments, including one or more of the following: a gift card purchase, a remittance to family located outside a country where a prepaid card account holder is located, and a bill payment to a third-party.

* * * * *